(12) United States Patent
Patel

(10) Patent No.: US 9,426,143 B2
(45) Date of Patent: Aug. 23, 2016

(54) PROVIDING SOCIAL NETWORK CONTENT BASED ON THE LOGIN STATE OF A USER

(71) Applicant: Facebook, Inc., Menlo Park, CA (US)

(72) Inventor: Dhiren Jerambhai Patel, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1 day.

(21) Appl. No.: 14/325,275

(22) Filed: Jul. 7, 2014

(65) Prior Publication Data

US 2016/0006721 A1    Jan. 7, 2016

(51) Int. Cl.
*H04L 29/06* (2006.01)
*H04L 12/58* (2006.01)
*G06Q 50/00* (2012.01)

(52) U.S. Cl.
CPC ............ *H04L 63/0815* (2013.01); *G06Q 50/01* (2013.01); *H04L 51/32* (2013.01)

(58) Field of Classification Search
CPC .... H04L 63/0815; H04L 51/32; G06Q 50/01; G06F 21/41
USPC ............................................................ 726/8
See application file for complete search history.

(56) References Cited

U.S. PATENT DOCUMENTS

| | | | |
|---|---|---|---|
| 6,421,768 B1 | 7/2002 | Purpura | |
| 7,669,123 B2 | 2/2010 | Zuckerberg et al. | |
| 8,225,376 B2 | 7/2012 | Zuckerberg et al. | |
| 8,402,094 B2 | 3/2013 | Bosworth et al. | |
| 8,438,364 B2 | 5/2013 | Venkataramani | |
| 8,768,863 B2 | 7/2014 | Gubin et al. | |
| 9,183,573 B2 | 11/2015 | Tseng | |
| 2014/0040042 A1 | 7/2002 | Schoen et al. | |
| 2008/0040474 A1 | 2/2008 | Zuckerberg et al. | |
| 2009/0070412 A1 | 3/2009 | D'Angelo et al. | |
| 2012/0317109 A1 | 12/2012 | Richter et al. | |
| 2013/0031489 A1 | 1/2013 | Gubin et al. | |
| 2013/0124538 A1 | 5/2013 | Lee et al. | |

(Continued)

FOREIGN PATENT DOCUMENTS

WO    WO 2012/060969 A1 *    5/2012    ............ G06F 15/173

OTHER PUBLICATIONS

Soomro et al., "The architecture of the Facebook Platform," Oct. 14, 2011, 4 pgs.

(Continued)

*Primary Examiner* — William Goodchild
(74) *Attorney, Agent, or Firm* — Morgan, Lewis & Bockius LLP

(57) ABSTRACT

An electronic device includes a display, one or more processors, and memory storing one or more programs. The one or more programs include a first program having a user-logged-in state for a first user and a user-logged-out state for the first user. The device communicates with a social network system; and displays a first user interface on the display. The first user interface includes a first predetermined area that corresponds to the first program. If the first program is in the user-logged-in state for the first user, the device displays in the first predetermined area first content from a plurality of users of the social network system that are connected to the first user. If the first program is in the user-logged-out state, the device displays in the first predetermined area second content that is selected for the first user, without displaying the first content.

14 Claims, 23 Drawing Sheets

(56) References Cited

U.S. PATENT DOCUMENTS

2013/0275514 A1* 10/2013 Tanaka ............... H04L 67/22 709/204
2014/0317012 A1* 10/2014 Can ............... G06Q 30/0279 705/329

OTHER PUBLICATIONS

The Tile Template Catalog (Windows Store Apps) downloaded on Mar. 5, 2014 from http://msdn.microsoft.com/en-us/library/windows/apps/hh761491.aspx, 64 pgs.
AxLiveTiles-Pro-for-Facebook, Jun. 10, 2015, http://apps.microsoft.com/windows/en-us/app/axlive-tiles-pro-for-facebook/75fbc48d-0d41-44f7-9160-ee381466333f, 2 pgs.
Facebook for Windows Phone gains secondary Live Tiles, Dec. 23, 2013, http://www.pcworld.com/article/2082574/facebook-for-windows-phone-gains-secondary-live-tiles.html, 4 pgs.
Facebook app for Windows Phone gets new Live Tiles, push notifications, login URI and more in huge update, Dec. 23, 2013, http://www.wpcentral.com/facebook-app-windows-phone-huge-update, 25 pgs.
Facebook beta for Windows Phone 8 updated with improved notifications, new Live Tiles, Nov. 27, 2013, http://www.wpcentral.com/facebook-beta-windows-phone-updated-improved-notifications, 29 pgs.
Top 10 Windows Phone Live Tiles, Dec. 28, 2013, http://www.youtube.com/watch?v=uPdfS3gR95E, 4 pgs.
HTC One review, Aug. 28, 2013, http://www.techradar.com/us/reviews/phones/mobile-phones/htc-one-1131862/review/3, 13 pgs.
Flipboard is Your Personal Magazine, Jul. 6, 2014, https://flipboard.com, 5 pgs.
Flipboard from Wikipedia, the free encyclopedia, page last modified Mar. 16, 2014, http://en.wikipedia.org/wiki/Flipboard, 3 pgs.
Friending, from Wikipedia, the free encyclopedia, page last modified Apr. 2, 2014, http://en.wikipedia.org/wiki/Friending, 4 pgs.
HTC BlinkFeed on the HTC One, Mar. 10, 2013, http://www.youtube.com/watch?v=71xA1V7BxC4, Mar. 10, 2013, 3 pgs.
How News Feed Works, https://www.facebook.com/help/www/327131014036297/, 1 pg.
Whiteboard it—the power of graph databases, Aug. 2013, http://www.computerweekly.com/feature/Whiteboard-it-the-power-of-graph-databases, 8 pgs.
Knowing the score: How Facebook's Graph Search knows what you want, Mar. 14, 2013, http://arstechnica.com/information-technology/2013/03/knowing-the-score-how-facebooks-graph-search-knows-what-you-want/, 4 pgs.
How-Google-and-Microsoft-taught-search to "understand" the Web, Jun. 6, 2012, http://arstechnica.com/information-technology/2012/06/inside-the-architecture-of-googles-knowledge-graph-and-microsofts-satori/, 10 pgs.
Facebook Platform from Wikipedia, the free encyclopedia, page last modified Jul. 1, 2014, http://en.wikipedia.org/wiki/Facebook_Platform, 4 pgs.
List of Social Networking Websites, page last modified Jun. 22, 2014, http://en.wikipedia.org/wiki/List_of_social_networking_websites, 19 pgs.
Social Graph from Wikipedia, the free encyclopedia, page last modified Jun. 27, 2014, http://en.wikipedia.org/wiki/Social_graph, 2 pgs.

* cited by examiner

614 In accordance with the determination that the first program is in the user-logged-in state for the first user, display in the first predetermined area third content that is selected for the first user 618 The second content is the same as the third content 620 The second content is distinct from the third content 622 While the first program is in the user-logged-in state for the first user, the first content from the plurality of users is displayed in the first predetermined area interspersed with the third content 624 While the first program is in the user-logged-in state for the first user, the first content from the plurality of users is displayed in the first predetermined area interspersed with the third content and interspersed with advertisements or links to advertisements selected for the first user 626 When the first program is in the user-logged-in state for the first user, the first content from the plurality of users and the third content are displayed in a scrolling list in the first predetermined area 628 The first program communicates with the social network system, and the third content is selected for the first user by the social network system based in part on a profile of the first user in the social network system 630 The first program communicates with the social network system, and the third content is selected for the first user by the social network system based in part on interactions of the first user with the social network system 632 The first program communicates with the social network system, and the third content is selected for the first user by the social network system based in part on prior interactions of users that are connected to the first user in the social network system

FIGURE 6B

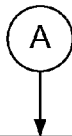

634 In accordance with a determination that the first program is in the user-logged-out state, display in the first predetermined area second content that is selected for the first user, without displaying the first content from the plurality of users of the social network system that are connected to the first user 636 The second content is selected for the first user by the social network system 638 The second content that is selected for the first user is sent from the social network system to the electronic device 640 When the first program is in the user-logged-out state, the second content selected for the first user is displayed in the first predetermined area interspersed with advertisements or links to advertisements selected for the first user 642 The second content is selected for the first user while the first program is in the user-logged-out state based in part on information, used for identifying the first user, that is contained in the electronic device 644 The second content is selected for the first user based in part on user interactions with the electronic device that are detected by the electronic device while the first program is in the user-logged-out state 646 In accordance with a determination that the first program is in an initial-login state, the initial-login state being distinct from the user-logged-in state and the user-logged-out state, display in the first predetermined area fourth content that is selected independent of a preference of the first user

FIGURE 6C

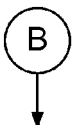

720 In accordance with a determination that the first user is logged out of the social network system, send to the electronic device second content that is selected for the first user for display in the first predetermined area in the first user interface, without sending the first content from the plurality of users of the social network system that are connected to the first user 722 In accordance with the determination that the first user is logged out of the social network system, send to the electronic device advertisements selected for the first user 724 The second content is selected for the first user, while the first user is logged out of the social network system, based in part on information, used for identifying the first user, that is contained in the electronic device 726 The second content is selected for the first user based in part on user interactions with the electronic device that are detected by the electronic device while the first user is logged out of the social network system 728 In accordance with a determination that no user has logged into the social network system from the electronic device, send to the electronic device fourth content that is selected independent of a preference of the first user

FIGURE 7B

PROVIDING SOCIAL NETWORK CONTENT BASED ON THE LOGIN STATE OF A USER

TECHNICAL FIELD

This relates generally to social networking, including but not limited to providing social network content based on the login state of a user.

BACKGROUND

Social networking websites and applications have become widespread in the past decade. Social networks, such as Facebook and Instagram, enable users to send and receive a vast amount of content, such as text comments (e.g., updates, announcements, replies), digital photos, videos, audio files, web pages, news articles, and/or links thereto.

Given the vast amount of such content, social networks strive to efficiently provide content to a particular user that is relevant to the user, without overwhelming the user. But social networks face an ongoing challenge to determine which content to provide to a particular user at a particular time in a particular circumstance.

SUMMARY

Accordingly, there is a need for more efficient methods and interfaces for providing social network content. Such methods and interfaces optionally complement or replace conventional methods for providing social network content.

In accordance with some embodiments, a method is performed at an electronic device with a display, one or more processors, and memory. The memory stores one or more programs for execution by the one or more processors. The method includes: communicating with a social network system that is remote from the electronic device; and displaying a first user interface on the display. The first user interface includes a first predetermined area on the display that corresponds to a first program. The first program has a user-logged-in state for a first user and a user-logged-out state that is distinct from the user-logged-in state for the first user. The method also includes, in accordance with a determination that the first program is in the user-logged-in state for the first user, displaying in the first predetermined area first content from a plurality of users of the social network system that are connected to the first user; and, in accordance with a determination that the first program is in the user-logged-out state, displaying in the first predetermined area second content that is selected for the first user, without displaying the first content from the plurality of users of the social network system that are connected to the first user.

In accordance with some embodiments, a client device includes a display, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a memory, and one or more processors to execute one or more programs stored in the memory includes one or more of the elements displayed in the method described above, which are updated in response to determinations, as described in the method described above. In accordance with some embodiments, a computer readable storage medium has stored therein instructions, which, when executed by an electronic device with a display and one or more processors, cause the device to perform the operations of the method described above. In accordance with some embodiments, an electronic device includes: a display, and means for performing the operations of the method described above.

Thus, client devices with displays and one or more processors are provided with more efficient methods and interfaces for providing social network content, thereby increasing the effectiveness, efficiency, and user satisfaction of and with such devices. A user is provided with more relevant content even when the user is logged out of a client device. Such methods and interfaces may complement or replace conventional methods for providing social network content.

In accordance with some embodiments, a method is performed at a social network system with one or more processors and memory. The memory stores one or more programs for execution by the one or more processors. The method includes: communicating with an electronic device associated with a first user that is remote from the social network system; in accordance with a determination that the first user is logged in to the social network system, sending to the electronic device first content from a plurality of users of the social network system that are connected to the first user for display in a first predetermined area in a first user interface; and, in accordance with a determination that the first user is logged out of the social network system, sending to the electronic device second content that is selected for the first user for display in the first predetermined area in the first user interface, without sending the first content from the plurality of users of the social network system that are connected to the first user.

In accordance with some embodiments, a social network system includes one or more processors and memory. The memory stores one or more programs configured to be executed by the one or more processors and the one or more programs include instructions for performing the operations of the method described above. In accordance with some embodiments, a computer readable storage medium has stored therein instructions, which, when executed by a social network system with one or more processors, cause the social network system to perform the operations of the method described above. In accordance with some embodiments, a social network system includes means for performing the operations of the method described above.

Thus, social network systems are provided with more efficient methods for providing social network content, thereby increasing the effectiveness, efficiency, and user satisfaction of and with such systems. Such methods may complement or replace conventional methods for providing social network content.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of providing social network content on an electronic device based on the login state of a user in accordance with some embodiments.

FIGS. 7A-7B are flow diagrams illustrating a method of providing social network content by a social network system based on the login state of a user in accordance with some embodiments.

DESCRIPTION OF EMBODIMENTS

Figure 1:
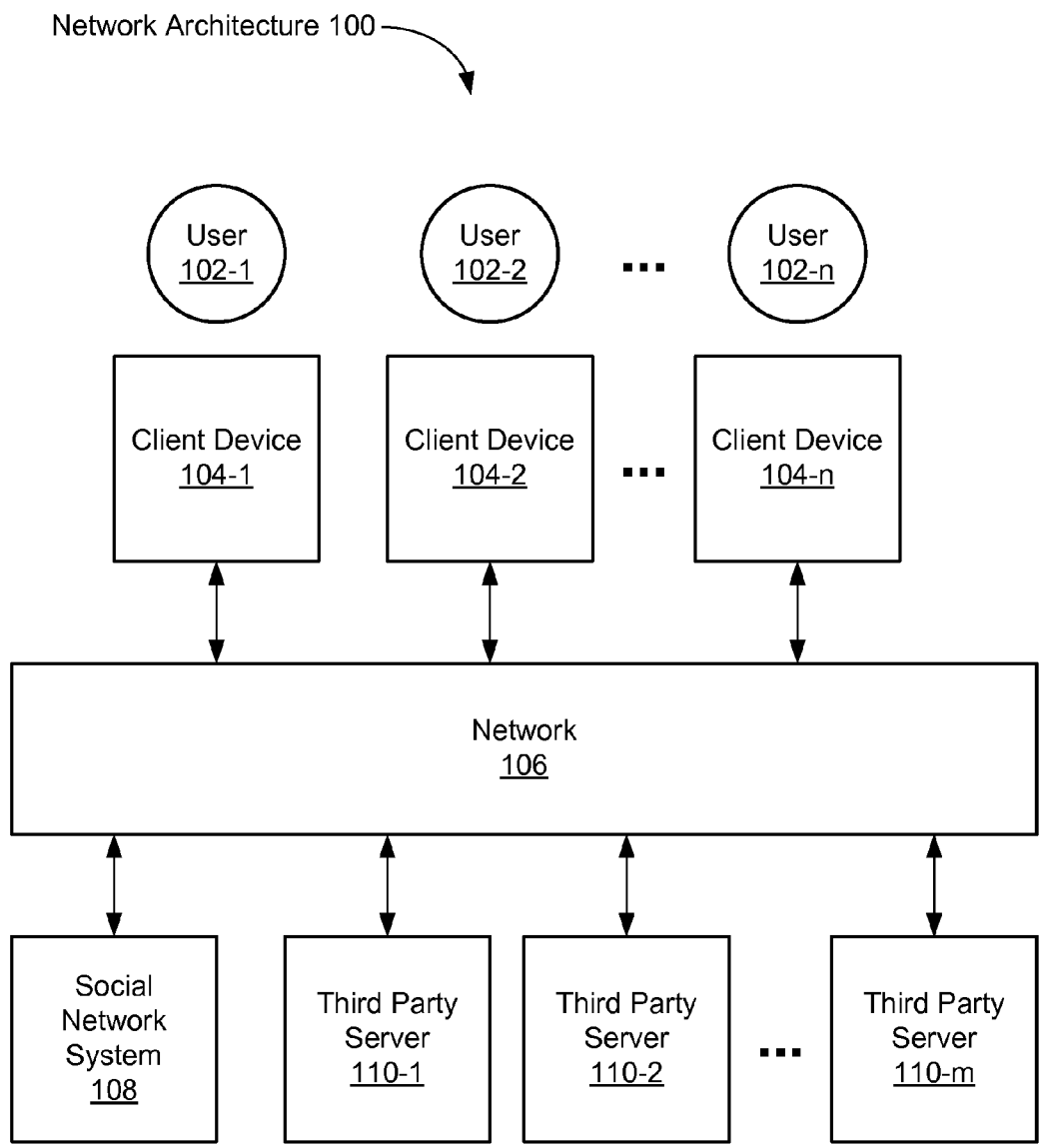
FIG. 1 is a block diagram illustrating an exemplary network architecture of a social network in accordance with some embodiments.

As noted above, social networks face an ongoing challenge to determine which content to provide to a particular user at a particular time in a particular circumstance. The methods, devices, and systems described herein take into account the login state of a user when providing social network content.

When a user at a client device is logged in to a social network, the user's profile in the social network is known and the social network provides to the client device content that is tailored to the user. For example, the social network provides content from friends that are connected to the user in the social network and, in some embodiments, news articles or links thereto that are selected for the user based on the user's profile. The user does not need to be viewing a social network web site or application full-screen on the client device in order to view this social network content. For example, this content is provided and displayed in a predetermined area, such as a tile or an icon, when the client device is displaying a home screen or a start screen to the user. In another example, this content is provided and displayed in a predetermined area, such as a tile or an icon, associated with a particular software application (e.g., a social networking application).

When the user at the client device is logged out of the social network, the identity of the user at the client device is still known to the social network (e.g., via a cookie on the client device), so the social network still provides to the client device content that is tailored to the user. For example, the social network provides news articles or links thereto that are selected for the user based on the user's profile. Here too, the user does not need to be viewing the social network web site or application full-screen on the client device in order to view this social network content. For example, this content is provided and displayed in a predetermined area, such as a tile, when the client device is displaying a home screen or start screen user. However, to protect user privacy while the user is logged out of the social network, content from friends that are connected to the user in the social network is not displayed in the predetermined area. The content that is provided to the user is tailored to the user in both the logged-in and logged-out state, but the type(s) of tailored content that is provided depends on the login state of the user. Moreover, the change in the type(s) of tailored content that is provided occurs automatically, in accordance with a determination of the login state of the user in the social network system.

In contrast to the user-tailored content that is provided in the logged-in and logged-out states, when a user profile cannot be associated with the client device (e.g., before a user logs in to the social network system from the client device), generic social network content, such as headline news or trending stories that are not tailored to the user (or any particular user), may be displayed in the predetermined area instead.

Figure 2:
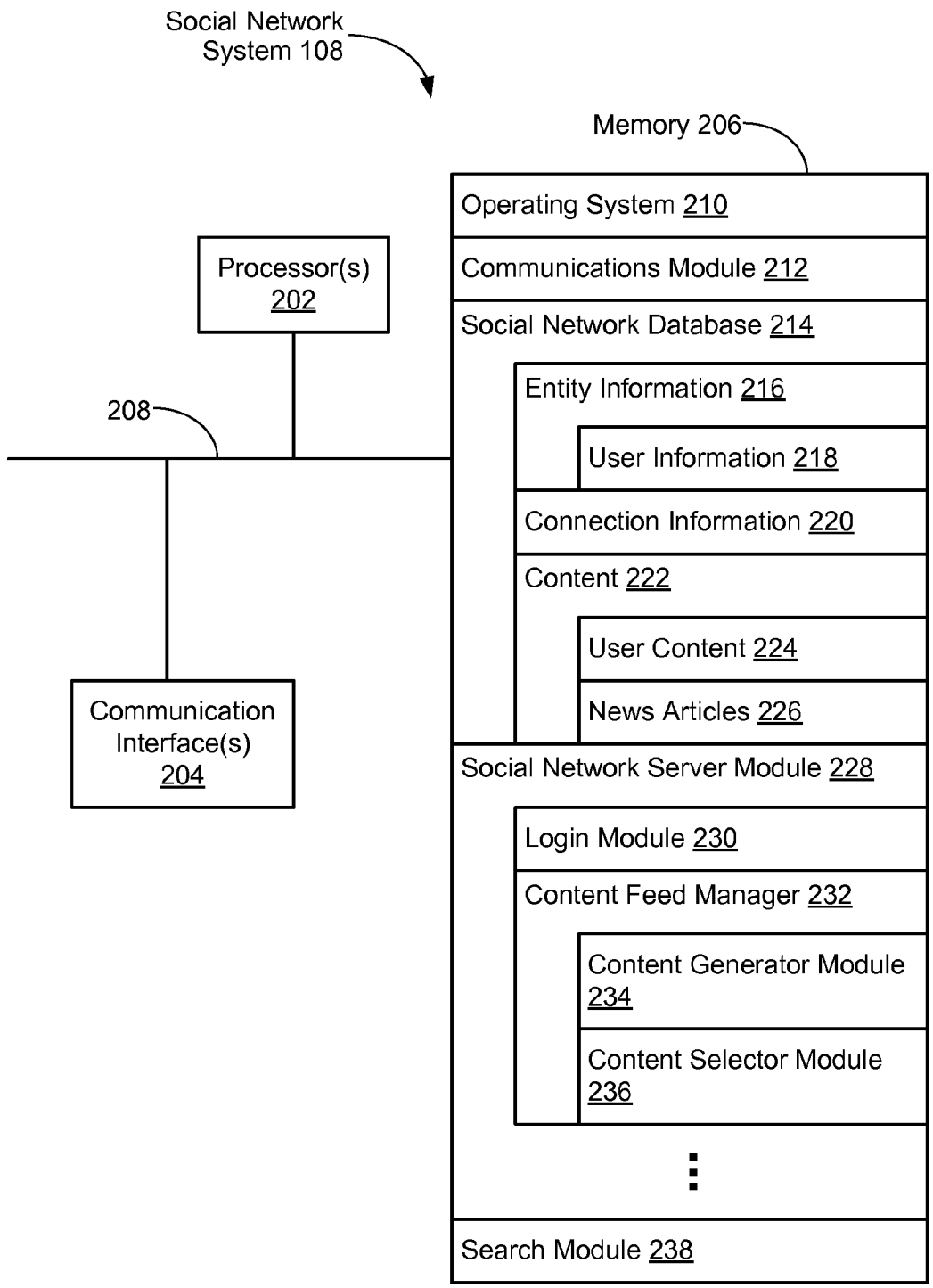
FIG. 2 is a block diagram illustrating an exemplary social network system in accordance with some embodiments.
Figure 3:
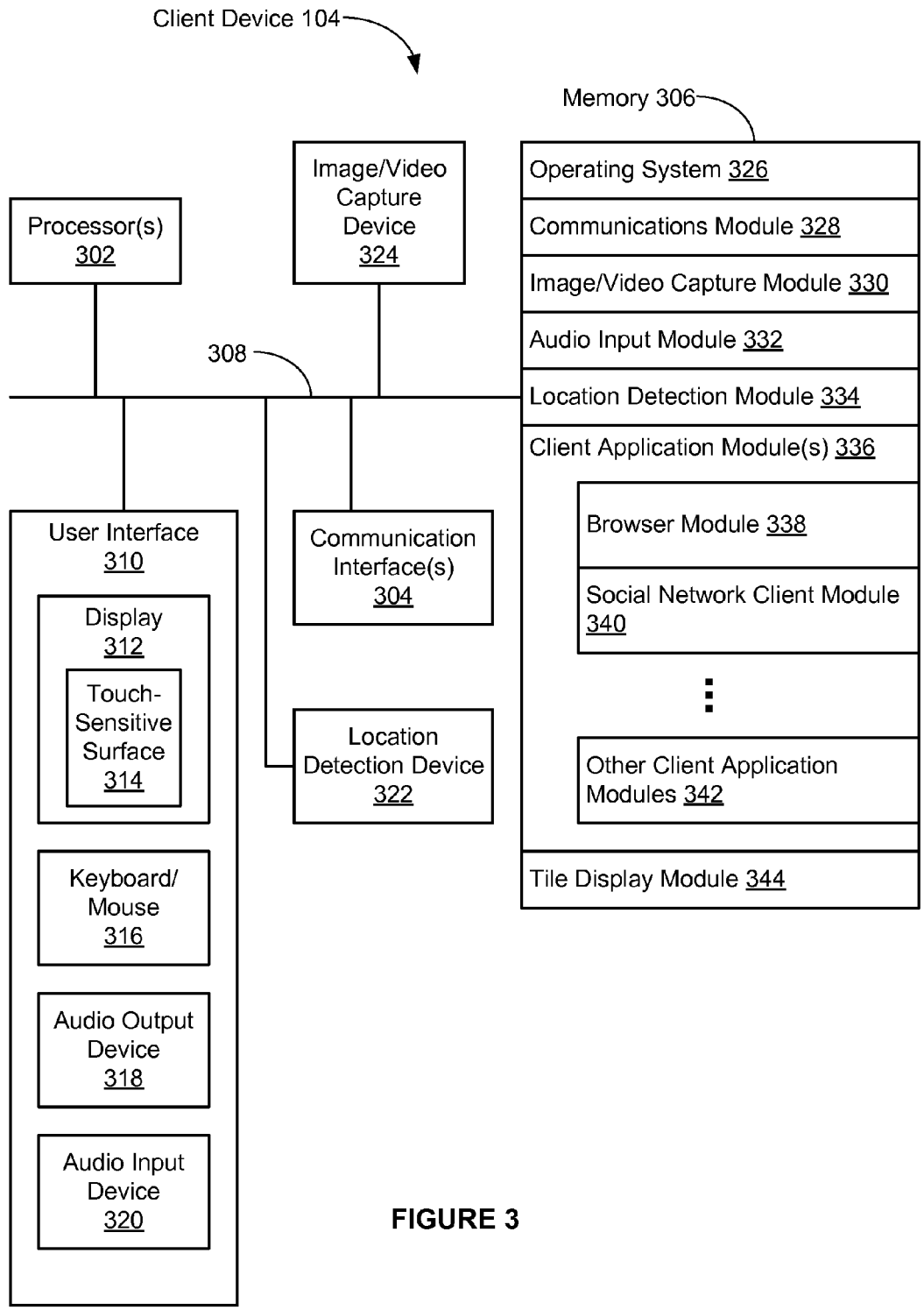
FIG. 3 is a block diagram illustrating an exemplary client device in accordance with some embodiments.
Figure 4A:
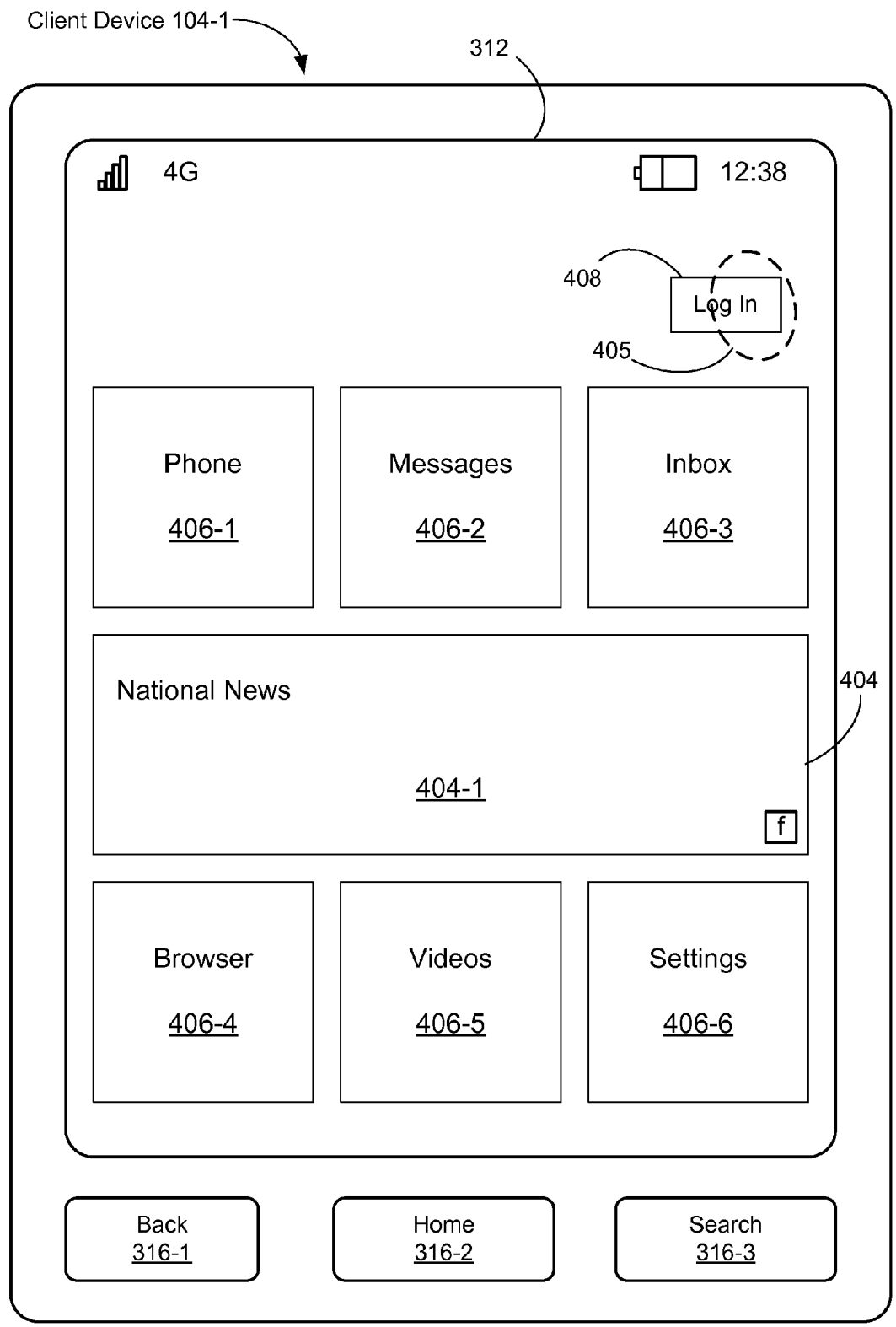
FIGS. 4A-4N illustrate exemplary user interfaces on a client device for providing social network content based on the login state of a user in accordance with some embodiments.
Figure 5:
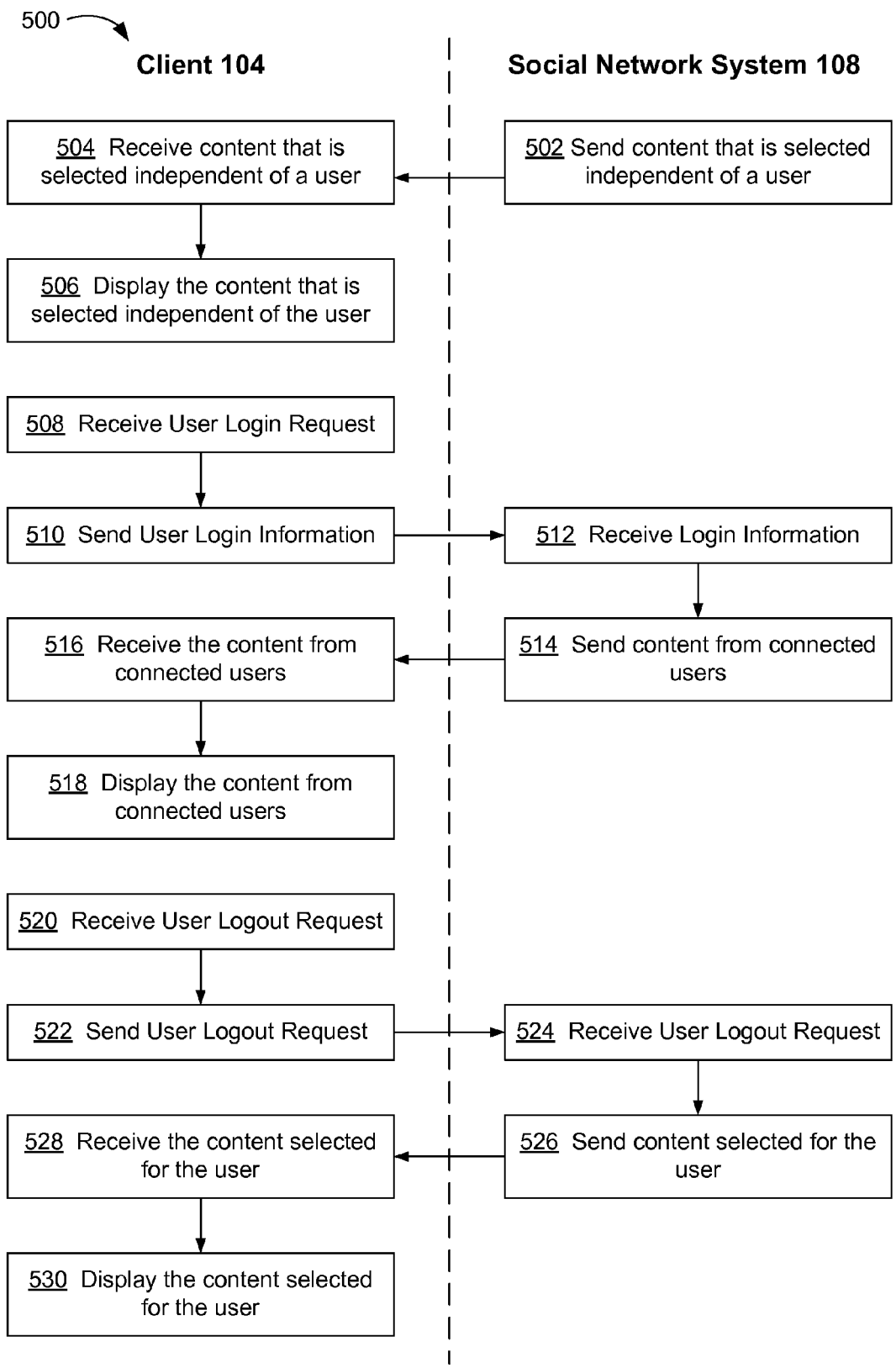
FIG. 5 is a flow diagram illustrating a method of providing social network content based on the login state of a user in accordance with some embodiments.
Figure 6A:
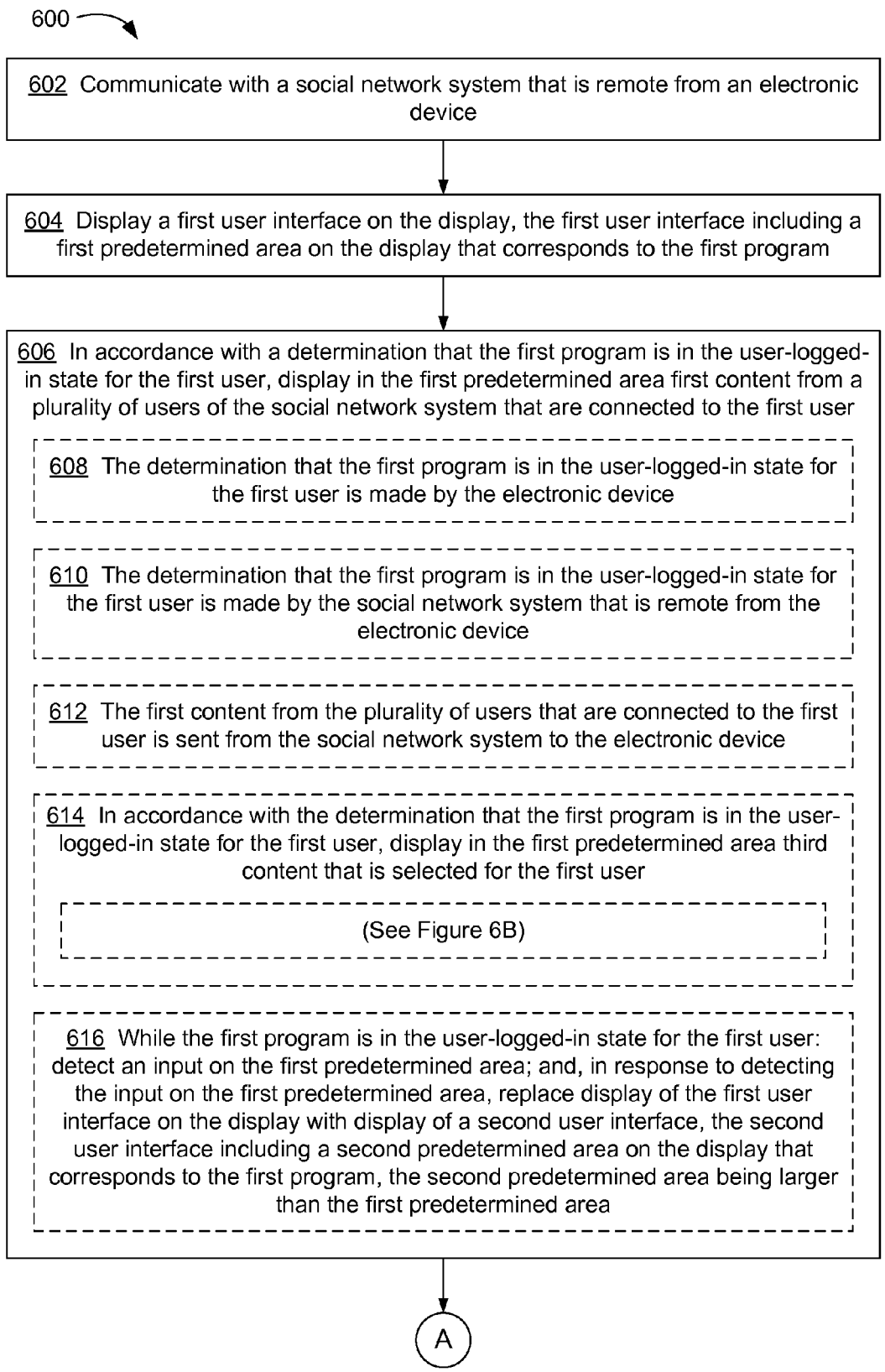
Figure 7A:
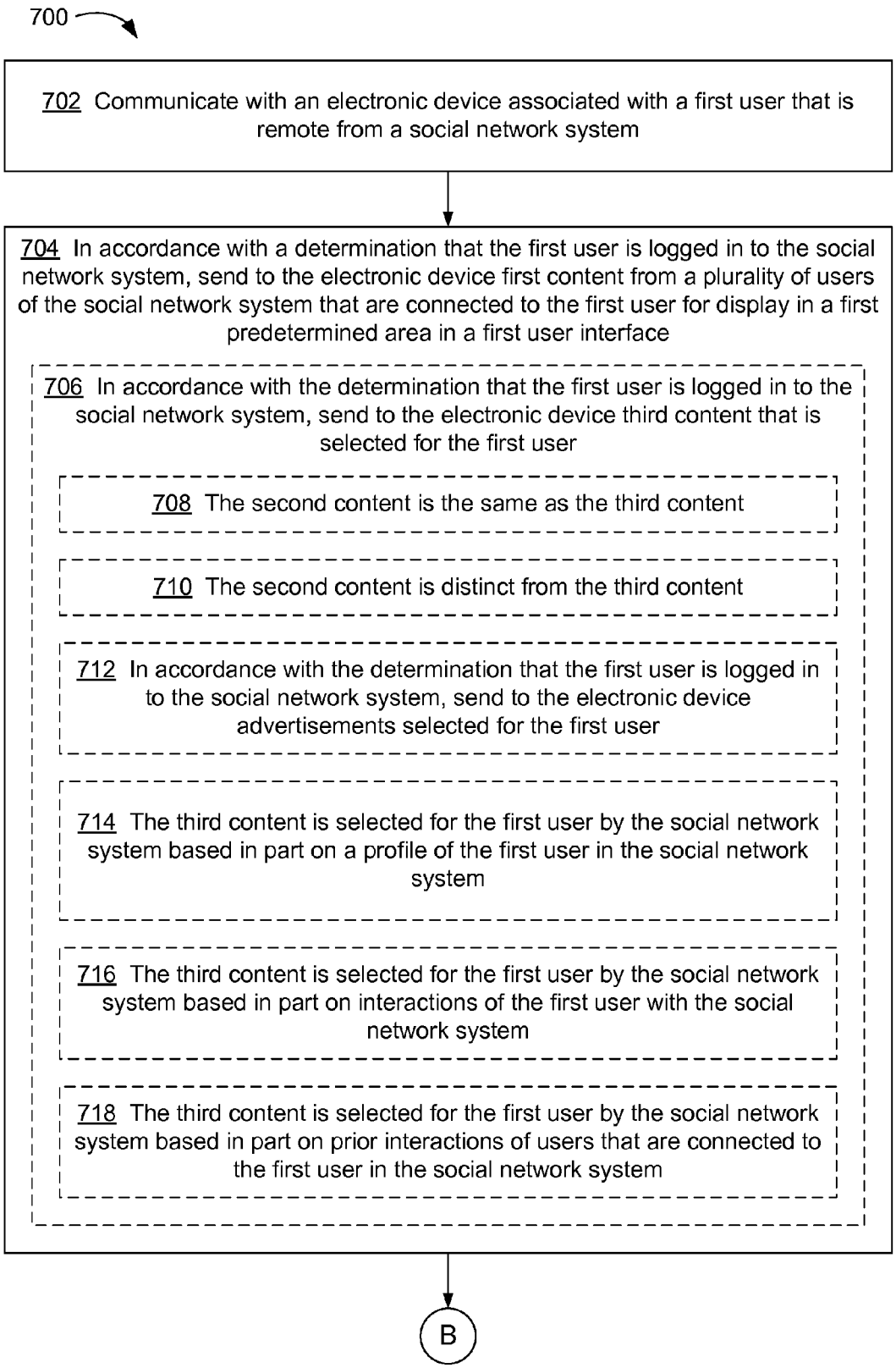

Below, FIGS. 1-3 provide a description of devices used for providing social network content (e.g., client devices and social network servers). FIGS. 4A-4N illustrate exemplary user interfaces of a client device providing social network content. FIG. 5 is a flow diagram illustrating interactions between a client device and a social network server for providing social network content. FIGS. 6A-6C are flow diagrams illustrating a method of providing social network content on a client device. FIGS. 7A-7B are flow diagrams illustrating a method of providing social network content from a social network system to a client device. The user interfaces in FIGS. 4A-4N are used to illustrate the processes in FIGS. 5, 6A-6C, and 7A-7B.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first user interface could be termed a second user interface, and, similarly, a second user interface could be termed a first user interface, without departing from the scope of the various described embodiments. The first user interface and the second user interface are both user interfaces, but they are not the same user interface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-*n* communicably connected to a social network system 108 by one or more networks 106.

In some embodiments, the client devices 104-1, 104-2, . . . 104-*n* are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system. In some embodiments, the social network system 108 is a single computing device such as a computer server, while in other embodiments, the social network system 108 is implemented by multiple computing devices working together to perform the actions of a server system (e.g., cloud computing). In some embodiments, the network 106 is a public communication network (e.g., the Internet or a cellular data network) or a private communications network (e.g., private LAN or leased lines) or a combination of such communication networks.

Users 102-1, 102-2, . . . 102-*n* employ the client devices 104-1, 104-2, . . . 104-*n* to access the social network system 108 and to participate in a social networking service. For example, one or more of the client devices 104-1, 104-2, . . . 104-*n* execute web browser applications that can be used to access the social networking service. As another example, one or more of the client devices 104-1, 104-2, . . . 104-*n* execute software applications that are specific to the social network (e.g., social networking "apps" running on smart phones or tablets, such as a Facebook social networking application running on an iPhone, Android, or Windows smart phone or tablet).

Users interacting with the client devices 104-1, 104-2, . . . 104-*n* can participate in the social networking service provided by the social network system 108 by posting information, such as text comments (e.g., updates, announcements, replies), digital photos, videos, audio files, links, and/or other electronic content. Users of the social networking service can also annotate information posted by other users of the social networking service (e.g., endorsing or "liking" a posting of another user, or commenting on a posting by another user). In some embodiments, information can be posted on a user's behalf by systems and/or services external to the social network or the social network system 108. For example, the user may post a review of a movie to a movie review website, and with proper permissions that website may cross-post the review to the social network on the user's behalf. In another example, a software application executing on a mobile client device, with proper permissions, may use global positioning system (GPS) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-*n* can also use the social network provided by the social network system 108 to define groups of users. Users interacting with the client devices 104-1, 104-2, . . . 104-*n* can also use the social network provided by the social network system 108 to communicate and collaborate with each other.

In some embodiments, the network architecture 100 also includes third-party servers 110-1, 110-2, . . . 110-*m*. In some embodiments, a given third-party server is used to host third-party websites that provide web pages to client devices 104, either directly or in conjunction with the social network system 108. In some embodiments, the social network system 108 uses iframes to nest independent websites within a user's social network session. In some embodiments, a given third-party server is used to host third-party applications that are used by client devices 104, either directly or in conjunction with the social network system 108. In some embodiments, social network system 108 uses iframes to enable third-party developers to create applications that are hosted separately by a third-party server 110, but operate within a social networking session of a user and are accessed through the user's profile in the social network system. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server is used to host enterprise systems, that are used by client devices 104, either directly or in conjunction with the social network system 108. In some embodiments, a given third-party server is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

FIG. 2 is a block diagram illustrating an exemplary social network system 108 in accordance with some embodiments. The social network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social network system 108 to other computers via the one or more communication network interfaces 204 (wired or wireless) and one or more communication networks, such as the Internet, cellular telephone networks, mobile data networks, other wide area networks, local area networks, metropolitan area networks, and so on;
  a social network database 214 for storing data associated with the social network, such as:
    entity information 216, such as user information 218;
    connection information 220; and
    content 222, such as user content 224 and/or news articles 226;
  a social network server module 228 for providing social networking services and related features, in conjunction with browser module 338 or social network client module 340 on the client system 104, which includes:
    a login module 230 for logging a user 102 at a client 104 into the social network system 108; and
    a content feed manager 232 for providing content to be sent to clients 104 for display, which includes:
      a content generator module 234 for describing objects in the social network database 214, such as images, videos, audio files, comments, status messages, links, applications, and/or other entity information 216, connection information 220, or content 222; and
      a content selector module 236 for choosing the information/content to be sent to clients 104 for display; and
  a search module 238 for enabling users of the social network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like," "attended," "played," "listened," "cooked," "worked at," or "watched" the entity at the other node. The page in the social networking service that corresponds to the entity at the other node may include, for example, a selectable "like," "check in," or "add to favorites" icon. After the user clicks one of these icons, the social network system 108 may create a "like" edge, a "check in" edge, or a "favorites" edge in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tiff and gif), graphics (vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the client device 104 includes one or more input devices that are capable, as a group, of detecting a touch, a pressure, a motion, a location, a height, a physical orientation, an air pressure, sound, light, temperature, a distance of a user's face or user's fingers from a surface of the display device 312, a viewing angle, a user's eye position and a direction of gaze, and/or a direction and speed of a user's eye movement. In client systems that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the processor(s) 302. Memory 306, or alternately the non-volatile memory device(s) within memory 306, includes a non-transitory computer readable storage medium. In some embodiments, memory 306 or the computer readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module) to the social network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340);
- one or more client application modules 336, including the following modules (or sets of instructions), or a subset or superset thereof:
  - a web browser module 338 (e.g., Internet Explorer by Microsoft, Firefox by Mozilla, Safari by Apple, or Chrome by Google) for accessing, viewing, and interacting with web sites (e.g., a social networking web site such as www.facebook.com),
  - a social network client module 340 for providing an interface to a social network (e.g., a social network provided by social network system 108) and related features; and/or
  - other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and
- a tile display module 344 for providing social network content (e.g., in one or more predetermined areas of the display).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. For example, in some embodiments, the tile display module 344 is included in the operating system 326. In some other embodiments, the tile display module 344 is included in the social network client module 340. In some embodiments, memory 206 and/or 306 store a subset of the modules and data structures identified above. Furthermore, memory 206 and/or 306 optionally store additional modules and data structures not described above.

Attention is now directed towards embodiments of user interfaces ("UI") and associated processes that may be implemented on a client device (e.g., client device 104 in FIG. 3).

FIGS. 4A-4N illustrate exemplary user interfaces on a client device for providing social network content based on the login state of a user in accordance with some embodiments. The user interfaces in these figures are used to illustrate the processes described below, including the processes in FIGS. 5, 6A-6C, and 7.

FIGS. 4A-4L illustrate exemplary user interfaces on a portable electronic device 104-1 (e.g., a mobile phone, a tablet, etc.) for providing social network content based on the login state of a user in accordance with some embodiments. The portable electronic device 104-1 is associated with (e.g., used or owned by) a first user.

FIG. 4A illustrates that the portable electronic device 104-1 includes a display 312. In some embodiments, the display 312 includes a touch-sensitive surface, and the display 312 is a touch-sensitive display (also called herein a touch screen). In some embodiments, the portable electronic device 104-1 also includes one or more physical buttons (e.g., a back button 316-1, a home button 316-2, and a search button 316-3, etc.).

In FIG. 4A, the display 312 displays a user interface that includes a plurality of user interface elements, including a plurality of tiles 404 and 406-1 through 406-6. As used herein, a tile refers to a user interface element that occupies a predetermined area of a user interface. In some embodiments, a tile is rectangular in shape. In some embodiments, a tile has a non-rectangular shape (e.g., an oval, a circle, a triangle, etc.). A tile typically corresponds to a particular application stored in the device 104-1. In some embodiments, the tile is used for displaying updates from the corresponding application. In some embodiments, tiles are displayed on a start screen or a home screen of the device. In some embodiments, tiles are displayed only on a start screen or a home screen of the device.

In some embodiments, the tile 404 corresponds to a social network application. As illustrated herein, FIG. 4A represents a state in which no user has logged into the social network application on the portable electronic device 104-1 (also called herein an initial-login state). While the device is in the initial-login state, the social network application has not recognized the user of the device. FIG. 4A illustrates that, in some embodiments, neutral content (e.g., content that is selected independent of an identity or a profile of the user of the device) is displayed in the tile 404 while the device is in the initial-login state. For example, national news 404-1 shown in FIG. 4A is selected and displayed independent of a profile of the first user in the social network system (e.g., independent of topics of interest of the first user). As another example (not shown), local news is selected and displayed based on the geographic location of the device and independent of a profile of the first user.

In FIG. 4A, the user interface shown on the display 312 also includes a login user interface element 408. In some embodiments, the login user interface element 408 is configured for logging a user into a social networking application (or into a social network system). In some embodiments, the login user interface element 408 is configured for logging a user into the electronic device 104-1. In some embodiments, logging into the electronic device 104-1 initiates logging the user into the social networking application (or into the social network system). FIG. 4A illustrates that a touch input 405 (e.g., a tap gesture) is detected at a location on the display 312 that corresponds to the login user interface element 408. Alternatively, the user may select the login user interface element 408 using a keyboard, a mouse, or any other input device (e.g., by providing a voice command to a microphone). Although FIG. 4A illustrates that the login user interface element 408 is displayed at a particular location on the display 312, the login user interface element 408 may be displayed at any location on the display 312. In some embodiments, the login user interface element 408 is displayed within the tile 404.

Figure 4B:
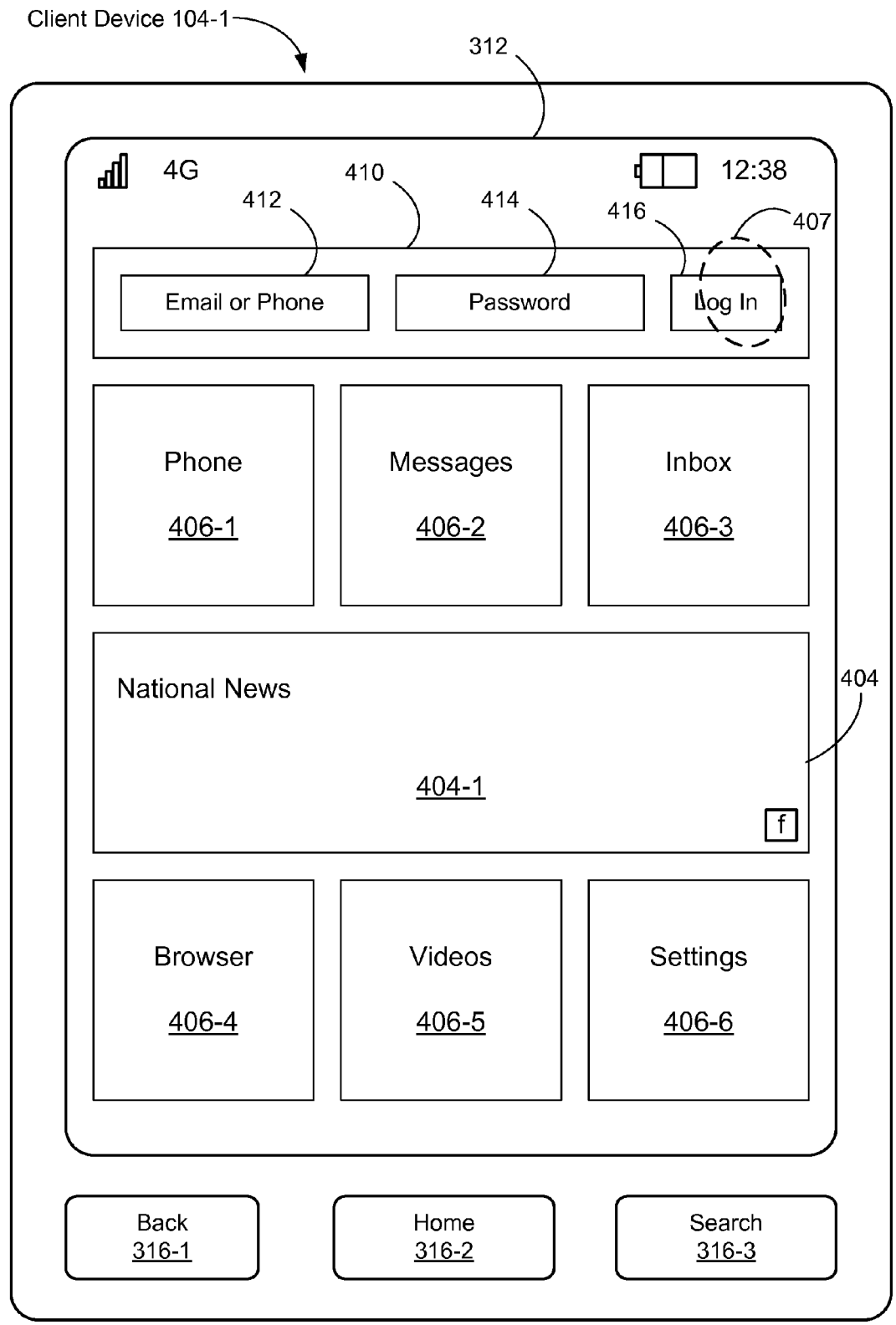

FIG. 4B illustrates that, in response to detecting the touch input 405 at a location on the display 312 that corresponds to the login user interface element 408 (FIG. 4A), a login window 410 is displayed on the display 312. As shown in FIGS. 4A and 4B, in some embodiments, in response to detecting the touch input 405 at a location on the display 312 that corresponds to the login user interface element 408, display of the login user interface element 408 is replaced with display of the login window 410. The login window 410 includes one or more user input areas (e.g., a user identifier input area 412 and/or a password input area 414). The user identifier input area 412 is configured for receiving a user identifier (also called herein a user ID or a login ID), such as an email address of a user, a phone number of a user, a fingerprint of a user, or a swipe pattern of a user. The password input area 414 is configured for receiving a login password of a user.

In FIG. 4B, the user login window 410 also includes a login user interface element 416. In some embodiments, the login user interface element 416 has a similar visual appearance to the login user interface element 408.

FIG. 4B also illustrates that, after receiving a user input that provides the user identifier and the password of the first user, a touch input 407 (e.g., a tap gesture) is detected at a location on the display 312 that corresponds to the login user interface element 416. Alternatively, the first user may select the login user interface element 416 using a keyboard, a button, a mouse, or any other input device (e.g., by providing a voice command to a microphone).

Figure 4C:
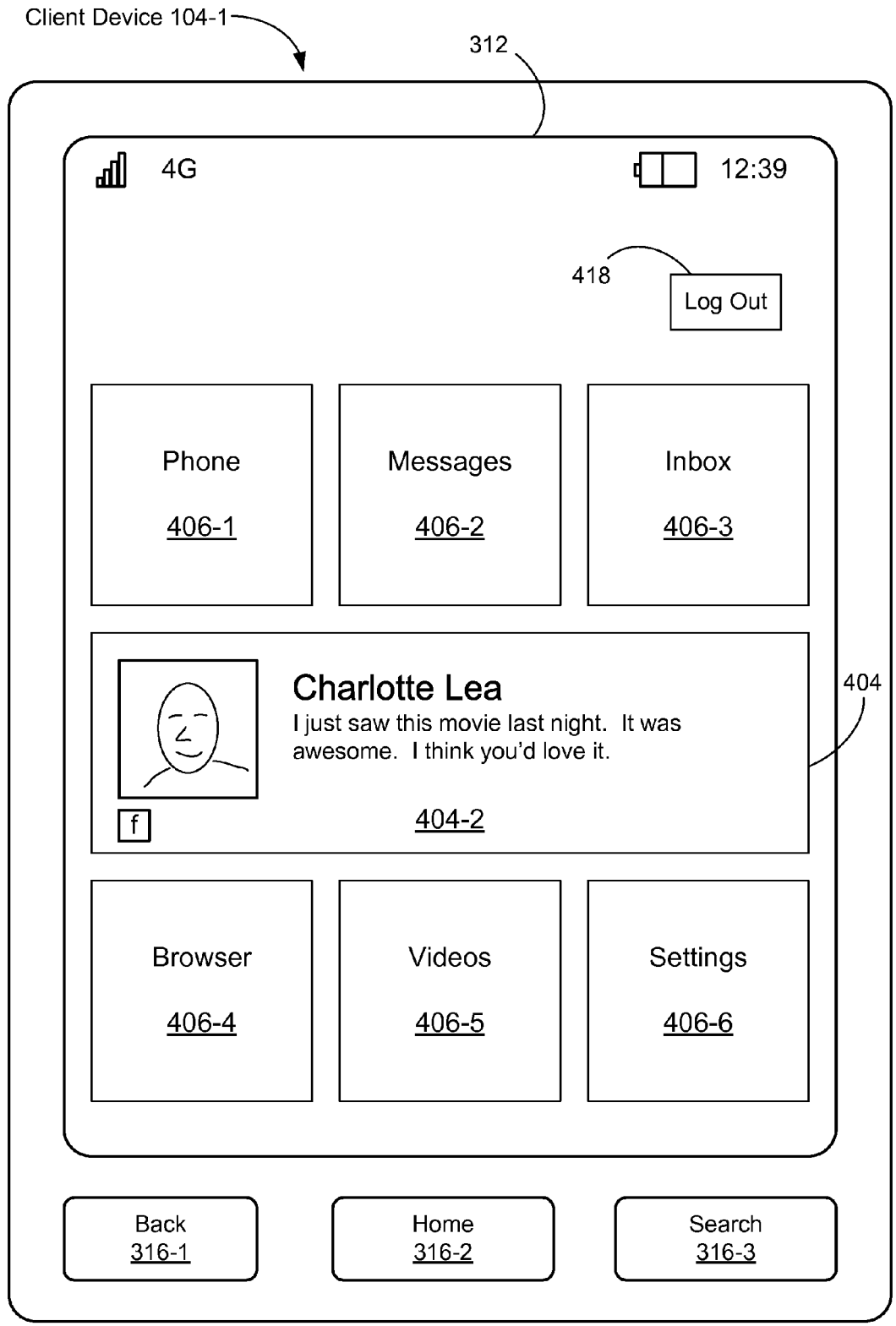

FIG. 4C illustrates that, in response to detecting the touch input 407 at a location on the display 312 that corresponds to the login user interface element 416 (FIG. 4B), an updated user interface is displayed on the display 312. The user interface illustrated in FIG. 4C assumes that the login attempt by the first user has been successful. In some embodiments, in response to a failed attempt to log in, a login failure user interface, which indicates that the login attempt has failed, is displayed (not shown).

As shown in FIGS. 4B and 4C, in some embodiments, display of the login window 410 is replaced with display of a logout user interface element 418 in response to determining that a login attempt has been successful.

FIG. 4C also illustrates that the tile 404 displays content 404-2 received from a user (e.g., Charlotte Lea) who is connected to the first user in the social network system. For example, Charlotte Lea is a friend of the first user in the social network system.

Figure 4D:
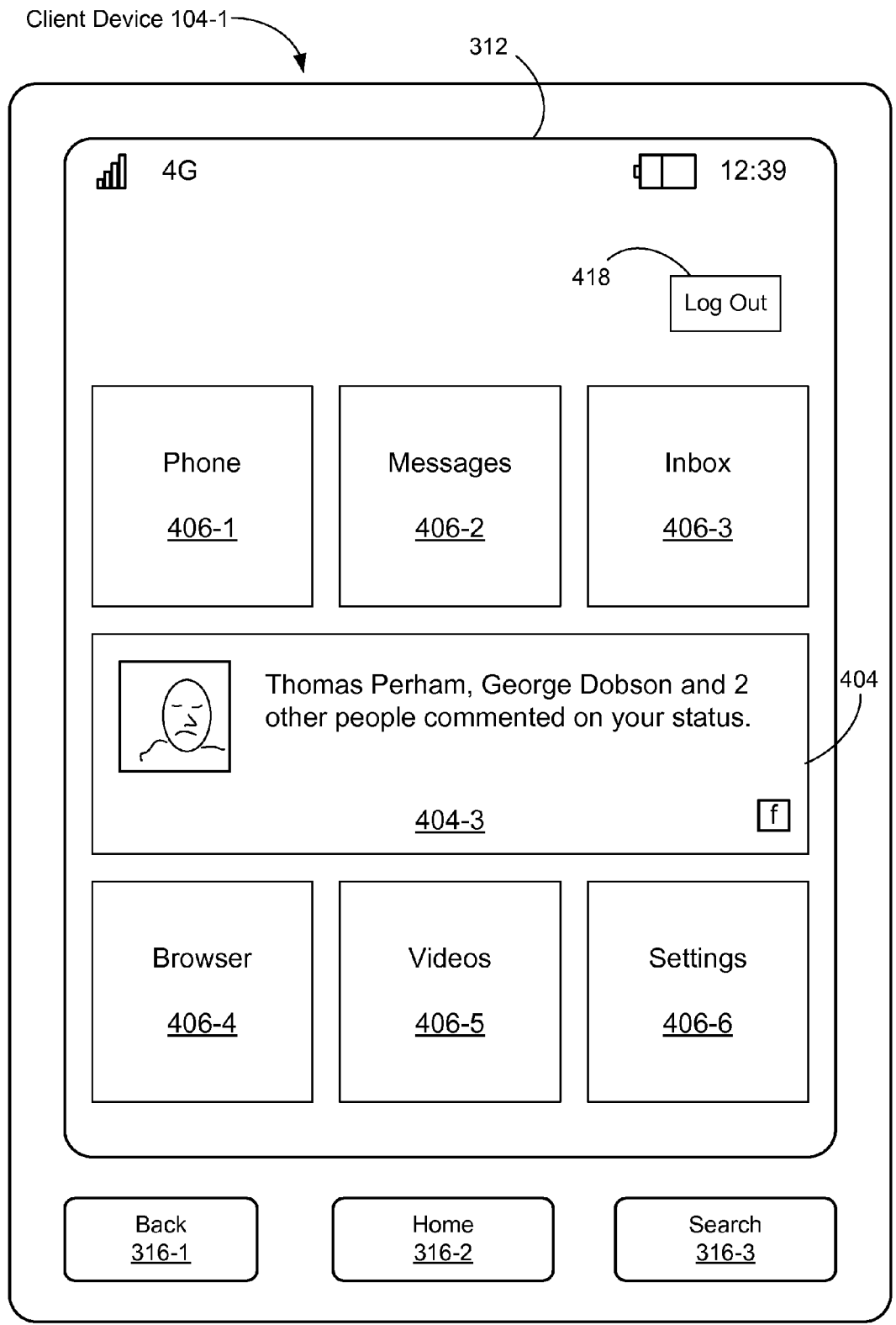

FIG. 4D illustrates that the content 404-2 displayed in the tile 404 (FIG. 4C) is replaced with content 404-3 received from other users (e.g., Thomas Perham, George Dobson, etc.) who are connected to the first user in the social network system. For example, Thomas Perham and George Dobson are friends of the first user in the social network system.

In some embodiments, the content 404-2 is replaced with the content 404-3 at a predefined interval (e.g., 2 seconds, 5 seconds, 10 seconds, 15 seconds, 20 seconds, 30 seconds, or any appropriate interval) independent of a user input.

In some embodiments, content items displayed in the tile 404 are selected in accordance with predefined criteria. In some embodiments, the content items displayed in the tile 404 are a predefined number of highly-ranked content items selected for the first user. In some embodiments, a content item is ranked based on recency (e.g., how recently the content item has been authored), popularity (e.g., how many users have shared and/or liked the content item), relationship between the author of the content item and the first user (e.g., whether the author of the content item is connected with the first user and/or how many times the first user has read content items written by the author), and/or whether the subject matter of the content item matches an interest of the first user.

Figure 4E:
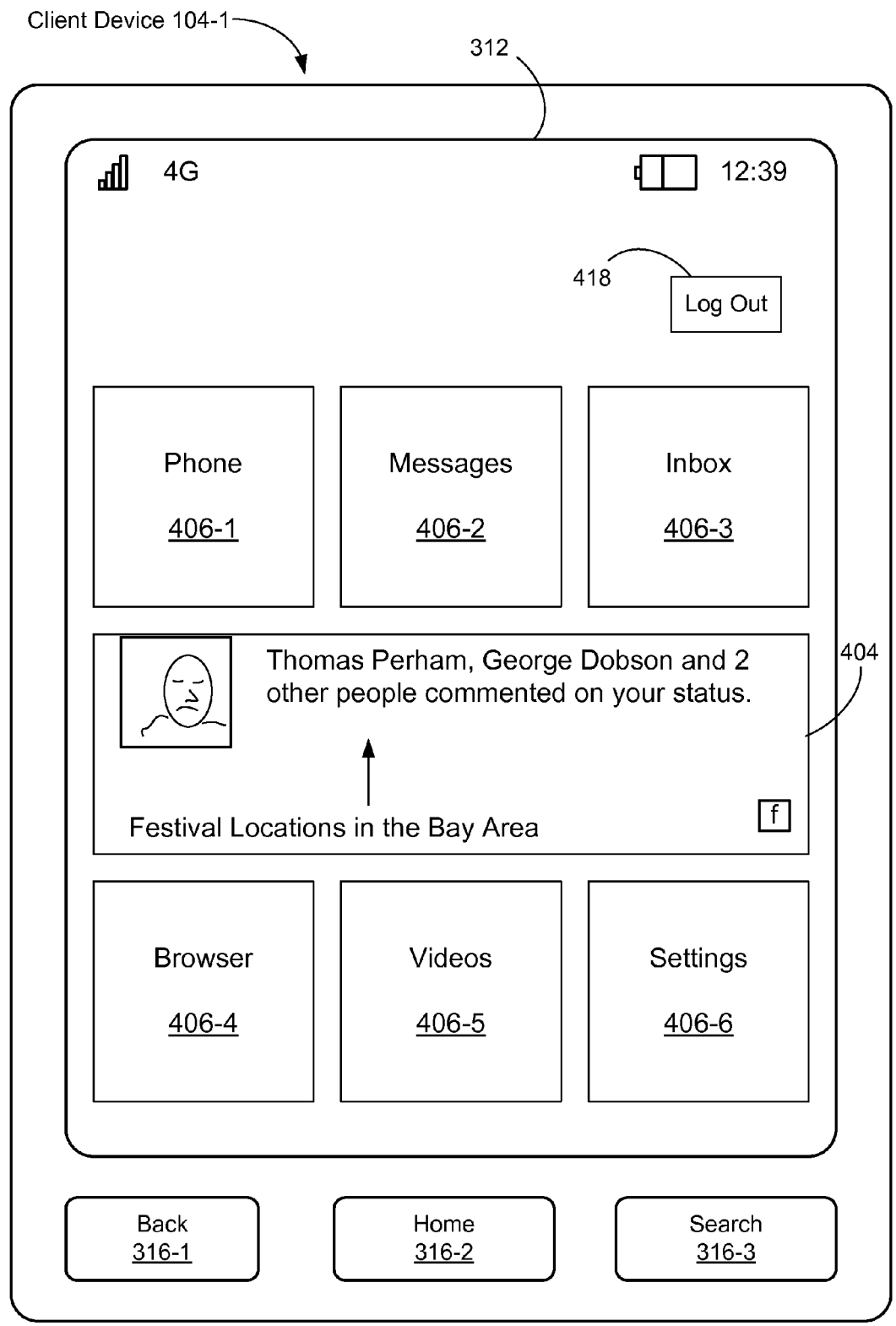
Figure 4F:
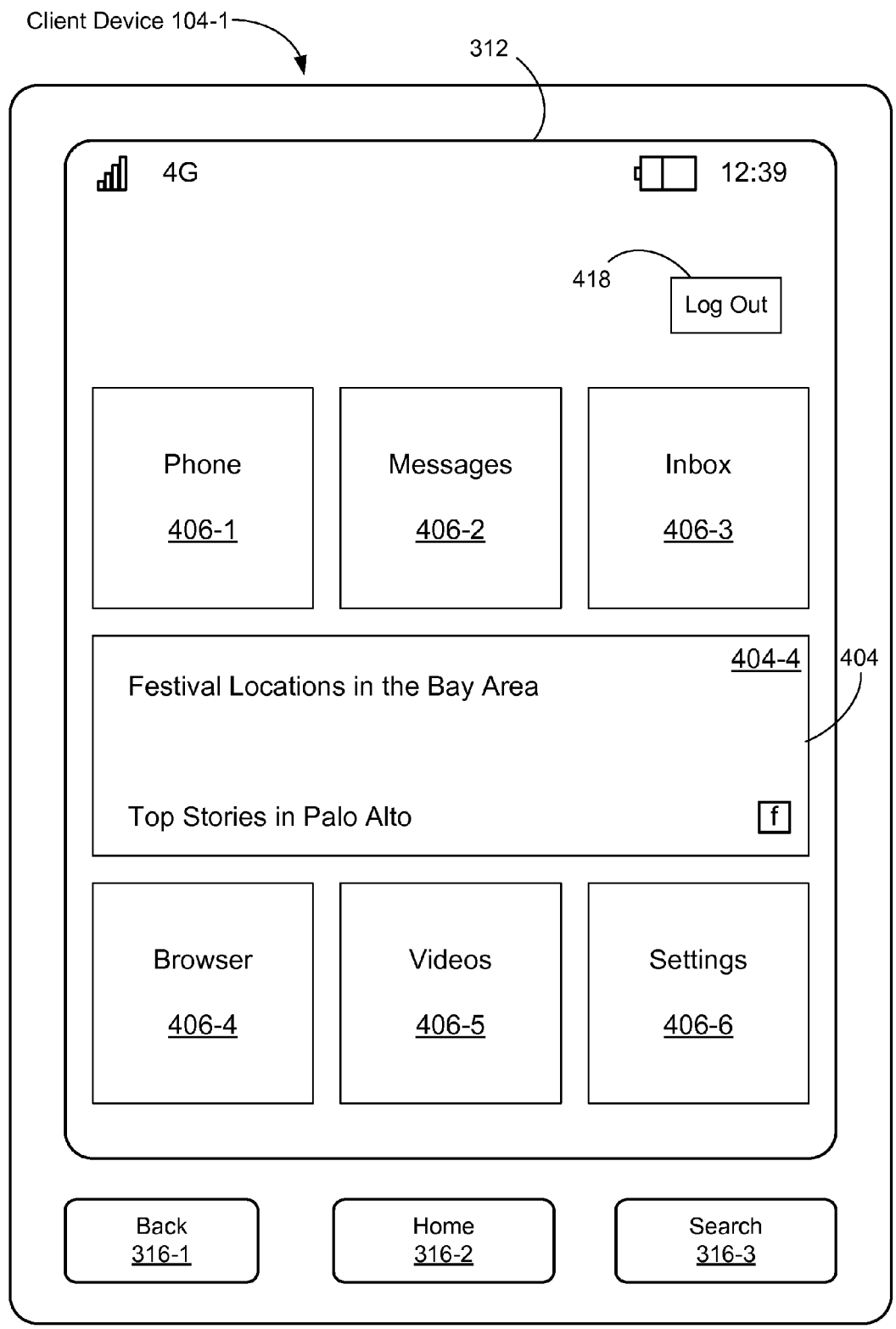

FIGS. 4D-4F illustrate an animation of a scrolling list displayed in the tile 404. In FIG. 4E, the content 404-3 shown in FIG. 4D scrolls up within tile 404 and additional content ("Festival Locations in the Bay Area") scrolls in from a bottom edge of the tile 404. In FIG. 4F, the content shown in FIG. 4D continues to scroll up, and the content 404-3 is no longer displayed within the tile 404. Instead, additional content 404-4 ("Top Stories in Palo Alto") scrolls in from the bottom edge of the tile 404.

Although FIGS. 4D-4F illustrate a vertical scrolling list, a horizontal scrolling list is optionally used instead. Alternatively, a different transition effect is used (e.g., fade out/fade in, changing opacity, transitioning from a fuzzy display to a clear display, etc.). For brevity, such details are omitted herein.

In FIG. 4F, the tile 404 includes content 404-4 that is selected for the first user (e.g., based on the user profile of the first user). For example, "Festival Locations in the Bay Area" is selected based on the first user's geographic location in the Bay Area and/or interests. "Top Stories in Palo Alto" is selected based on the first user's geographic location in Palo Alto.

Figure 4G:
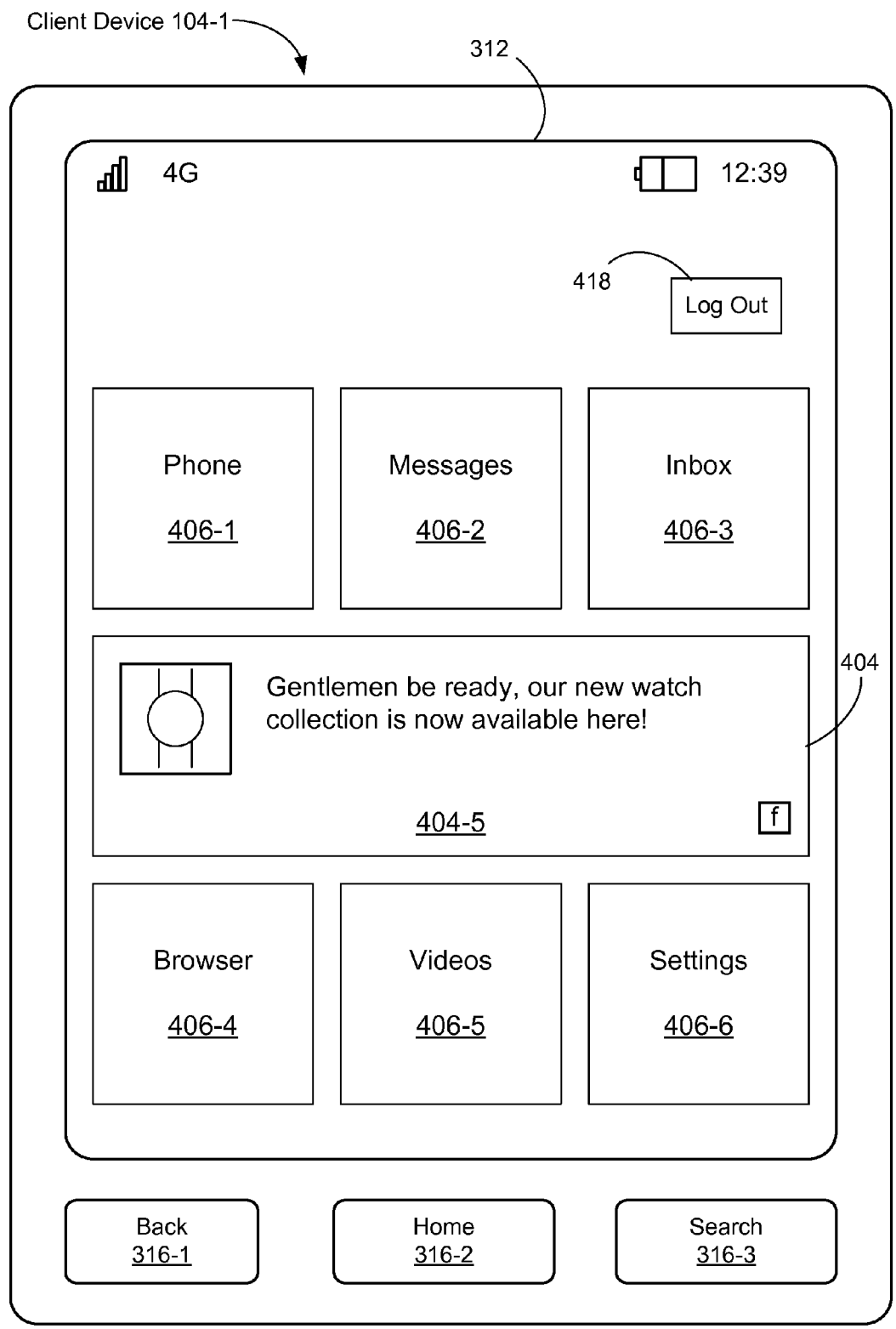

FIG. 4G illustrates that, in some embodiments, advertisement 404-5 is displayed in the tile 404. In some embodiments, the advertisement 404-5 is selected for the first user (e.g., based on the user profile of the first user).

Figure 4H:
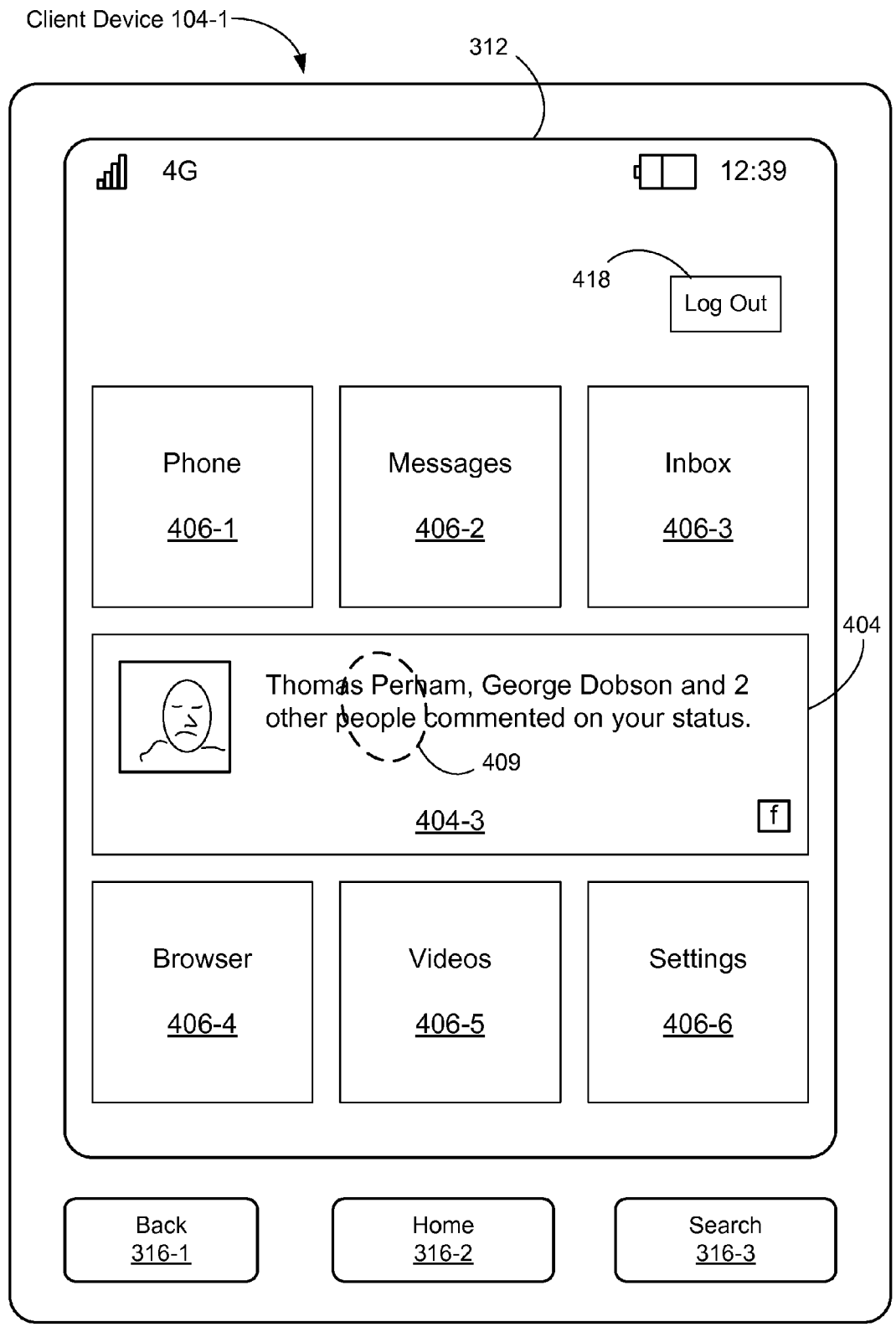
Figure 4I:
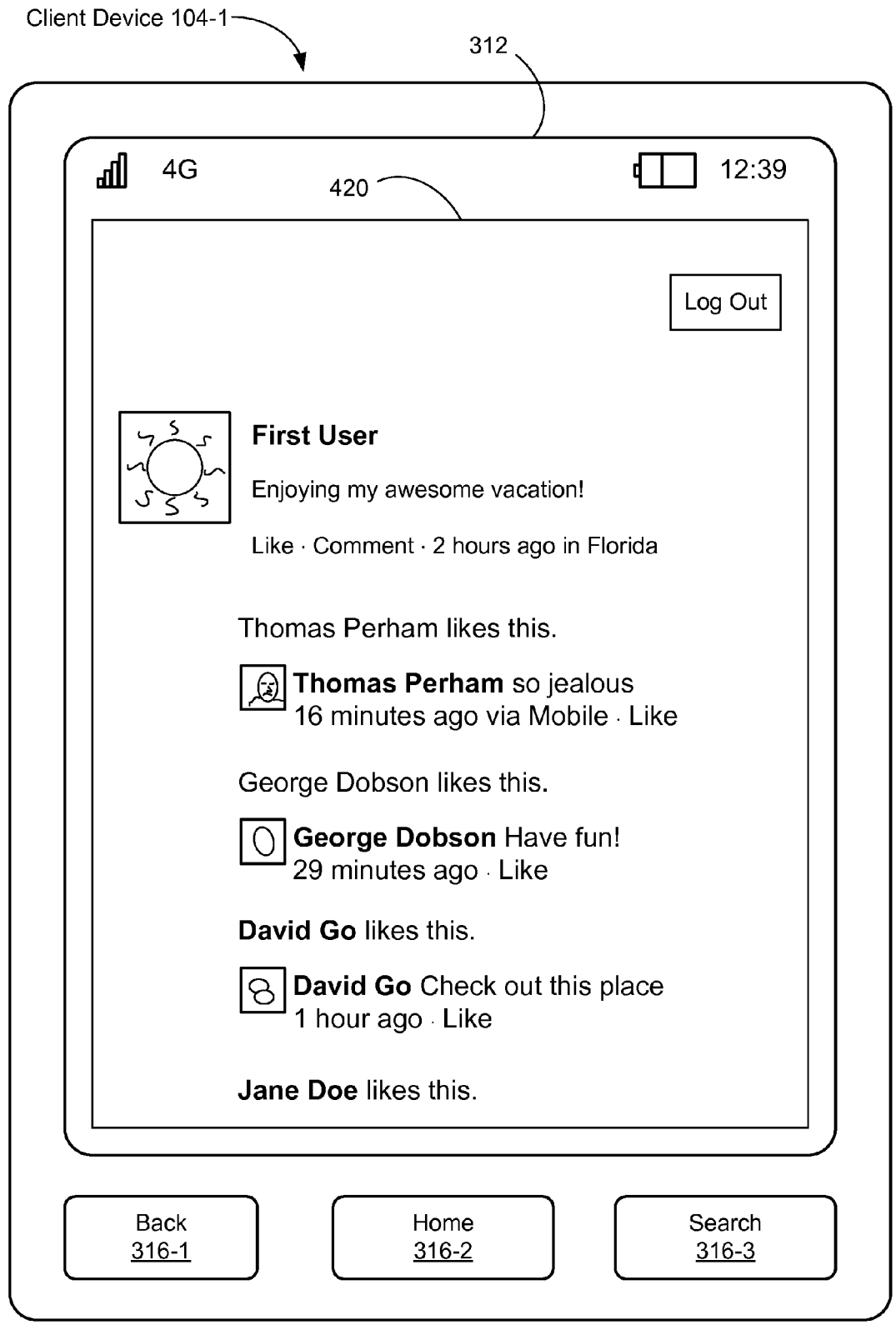

FIGS. 4H-4I illustrate operations associated with a user selection of a tile in accordance with some embodiments.

FIG. 4H illustrates that, while displaying the content 404-3 in the tile 404, a touch input 409 (e.g., a tap gesture) is detected at a location on the display 312 that corresponds to the tile 404. Alternatively, the first user may select the login user interface element 404 using a keyboard, a button, a mouse, or any other input device (e.g., by providing a voice command to a microphone).

FIG. 4I illustrates that, in response to detecting the touch input 409 at a location on the display 312 that corresponds to the tile 404 (FIG. 4H), the previously displayed user interface (FIG. 4H) is replaced with a user interface 420. In some embodiments, the user interface 420 corresponds to the social network application. The user interface 420 of the social network application shown in FIG. 4I occupies a larger area on the display than the tile 404 shown in FIG. 4H. The user interface 420 of the social network application includes social network content (e.g., content from connections/friends of the first user in the social network).

Although FIGS. 4H-4I illustrate user interfaces that are displayed while the first user is logged in to the social network system, similar operations may be performed before the first user logs into the social network system or after the first user has logged out of the social network system. For example, in response to detecting a touch input at a location on the display 312 that corresponds to the tile 404 illustrated in FIG. 4B, the user interface illustrated in FIG. 4B is replaced with a user interface that is a full screen display of national news and/or trending stories (e.g., analogous to the user interface illustrated in FIG. 4I).

Figure 4J:
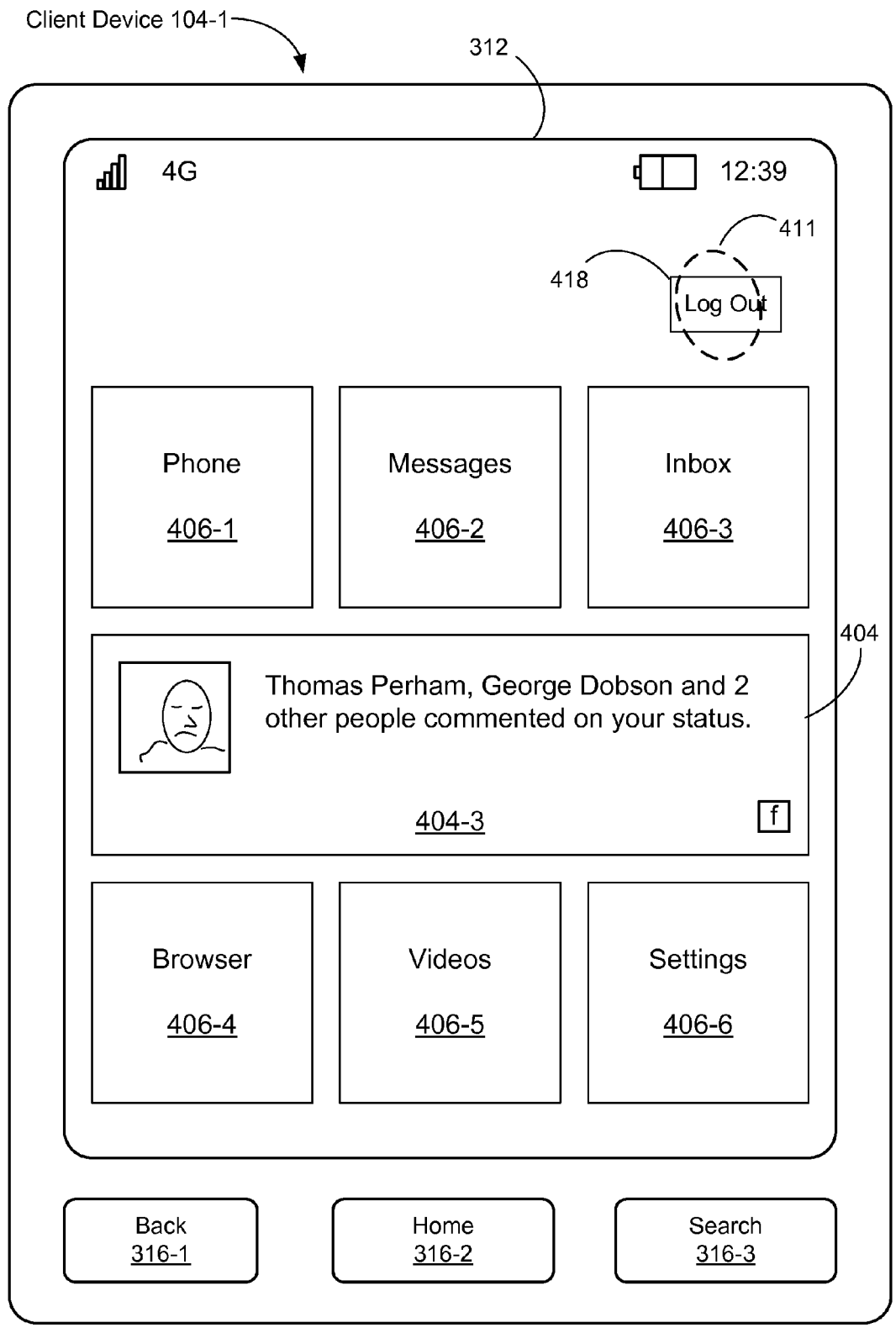
Figure 4K:
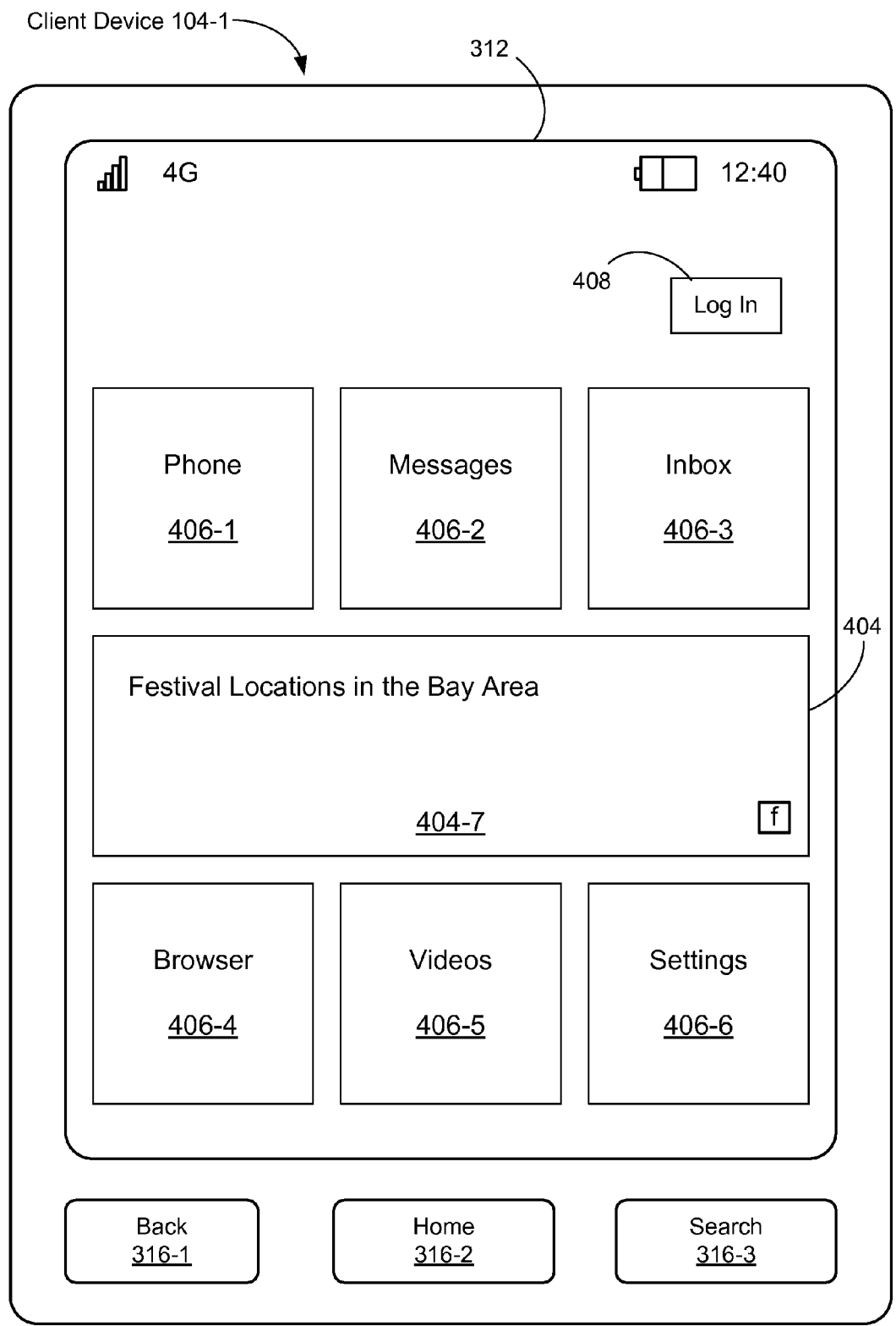
Figure 4L:
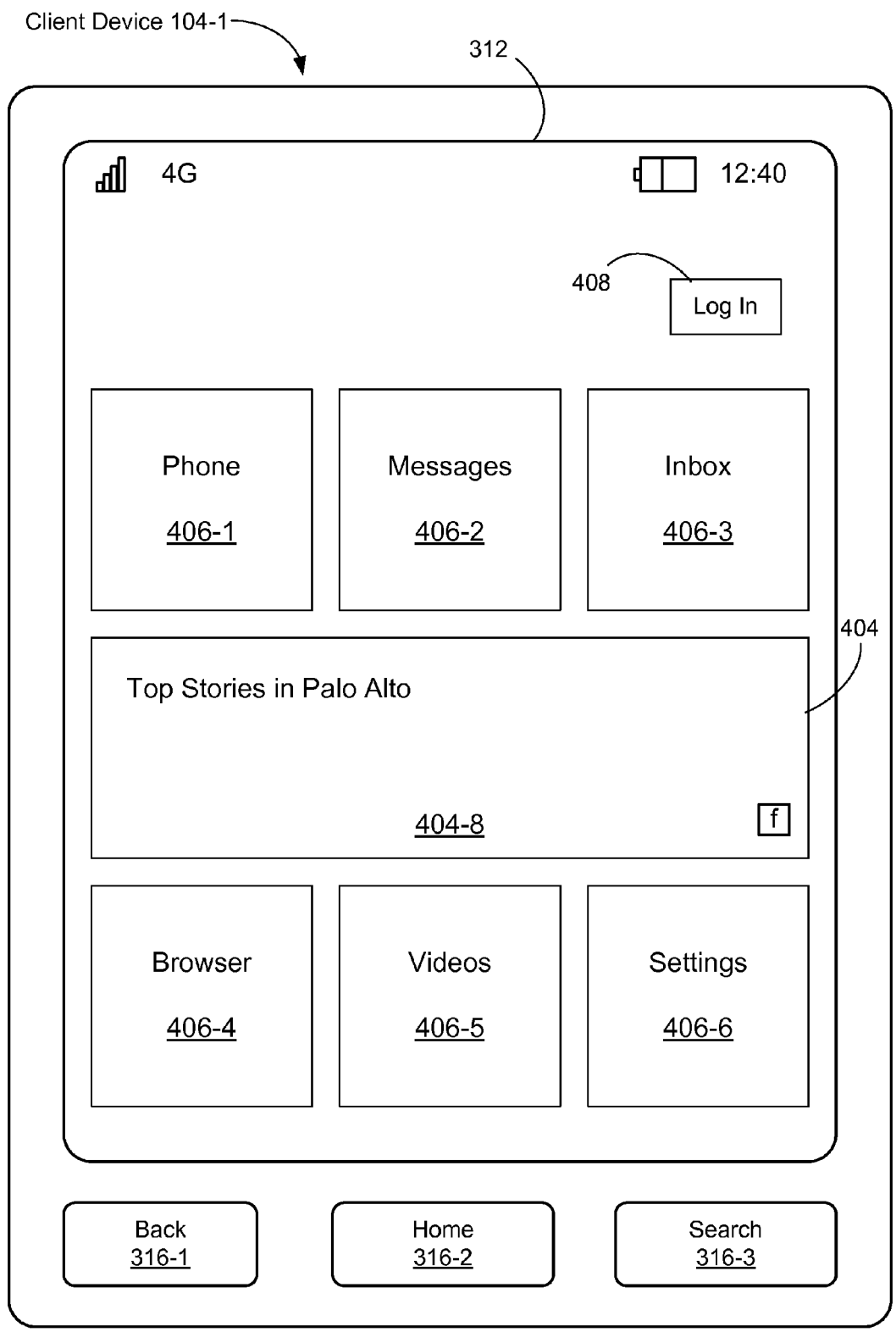

FIGS. 4J-4L illustrate operations associated with a user selection of a logout user interface element in accordance with some embodiments.

FIG. 4J illustrates that a touch input 411 (e.g., a tap gesture) is detected at a location on the display 312 that corresponds to the logout user interface element 418. Alternatively, the first user may select the logout user interface element 418 using a keyboard, a button, a mouse, or any other input device (e.g., by providing a voice command to a microphone).

FIG. 4K illustrates that, in response to detecting the touch input 411 at a location on the display 312 that corresponds to the logout user interface element 418 (FIG. 4J), the content previously displayed in the tile 404 is replaced with content 404-7 selected for the first user (e.g., stories selected based on the first user's geographic location, stories for topics that the first user is interested in, etc.).

FIG. 4L illustrates that, after a predefined interval, the content 404-7 is replaced with other content 404-8 that is selected for the first user (e.g., stories selected based on the first user's geographic location, stories for topics that the first user is interested in, etc.).

As shown in FIGS. 4K and 4L, after the first user logs out, content from users of the social network system that are connected to the first user in the social network system (e.g., content from friends of the first user in the social network) is not displayed in the tile 404. This eliminates privacy concerns associated with displaying private messages after the first user has logged out of the social network.

Although FIGS. 4A-4L have been described as exemplary user interfaces on the portable electronic device 104-1, analogous user interface can be displayed on a display of a non-portable electronic device (e.g., a desktop computer). For brevity, these analogous user interfaces in a non-portable electronic device are not shown.

Figure 4M:
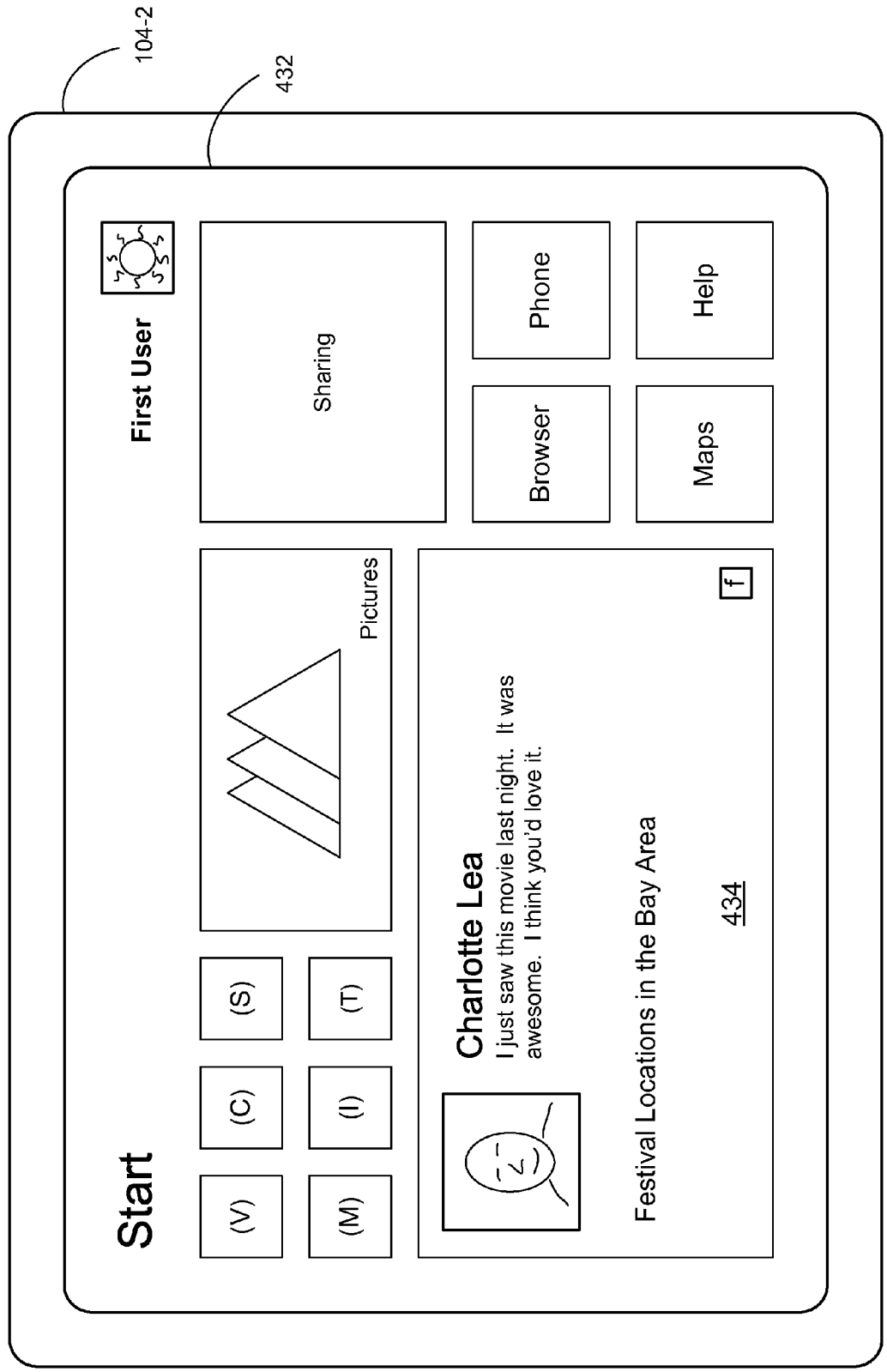
Figure 4N:
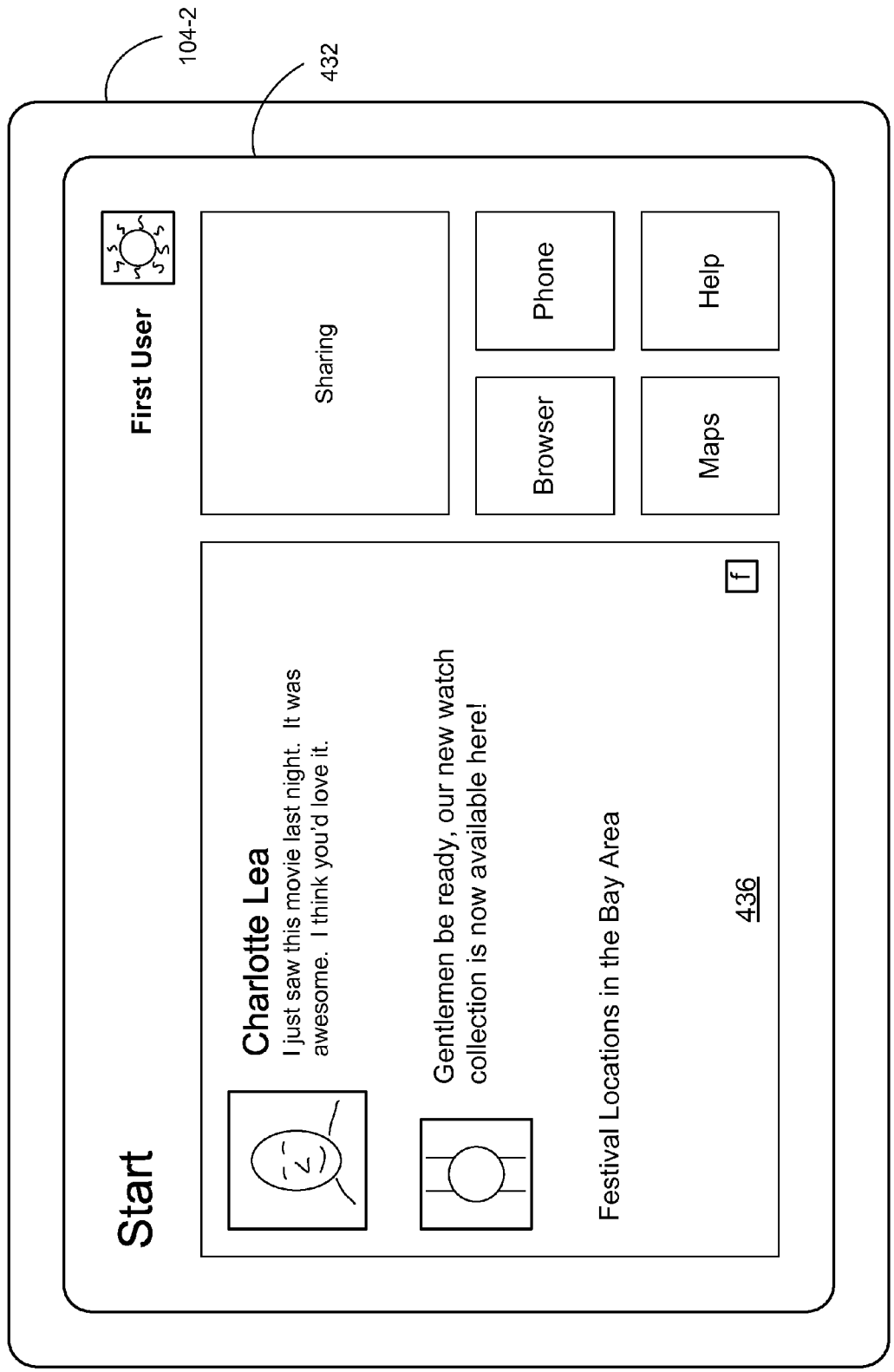

FIGS. 4M-4N illustrate exemplary user interface on a non-portable client device 104-2 (e.g., a desktop computer) for providing social network content when the first user is logged in to the social network in accordance with some embodiments. In FIGS. 4M and 4N, the device includes a display 432.

In FIG. 4M, the display 432 displays a user interface that includes a plurality of user interface elements, including a plurality of tiles, including tile 434. As shown in FIG. 4M, in some embodiments, in tile 434, content from a user of the social network system who is connected to the first user (e.g., Charlotte Lea) is interspersed with content that is selected for the first user (e.g., "Festival Locations on the Bay Area" based on the first user's geographic location).

FIG. 4N illustrates that the display 432 displays a user interface that includes a tile 436. In FIG. 4N, content from a user of the social network system who is connected to the first user (e.g., Charlotte Lea) is interspersed with content that is selected for the first user (e.g., based on the first user's geographic location) and one or more advertisements.

Although FIGS. 4M and 4N illustrate spatially interspersed contents, it is also possible to display temporally interspersed contents (e.g., sequentially displaying content items in tile 434 or 436).

FIG. 5 is a flow diagram illustrating a method 500 of providing social network content based on the login state of a user in accordance with some embodiments. In FIG. 5, operations performed by the client device 104 are shown on the left-hand side and operations performed by the social network system 108 are shown on the right-hand side.

Before any user logs into the social network system from the client device, the social network system sends (502) to the client device content that is selected independent of a user of the client device (e.g., neutral content, such as headline news or trending news).

As used in the specification, figures, and claims, the social network system "sending" content to an electronic device (e.g., client device 104) means that the social network system sends and/or initiates a process that sends the content to the electronic device. After the social network system sends and/or initiates sending the content, network 106 may also be involved in the process that sends the content to the electronic device. In some embodiments, after the social network system sends and/or initiates sending the content, one or more third party servers 110 are also involved in the process that sends the content to the electronic device. In some embodiments, the social network system initiates the process by sending instructions to a third party server 110 to send the content and, in turn, the third party server sends the content to the electronic device via network 106, or via network 106 and social network system 108. Thus, in some embodiments, the social network system "sending" content to an electronic device includes the social network system having the content sent to the electronic device by a third party server. In some embodiments, the social network system sends content in the form of a link to the electronic device via network 106. Subsequent activation of the link on the electronic device (e.g., by a user tapping or clicking on the link) results in a corresponding web page or other content being sent to the electronic device via network 106 and one or both of social network system 108 and third party server 110. An analogous meaning applies to content that is "sent" from the social network system to the electronic device: the social network system sent and/or initiated a process that sent the content to the electronic device.

The client device receives (504) the content that is selected independent of the user of the client device. In some embodiments, the client device receives the content that is selected independent of the user of the social network system (e.g., independent of an identity of the user in the social network system). In some embodiments, the social network system 108 sends the content independent of a request from the client device (e.g., a "push" process). In some embodiments, the social network system 108 sends the content in response to a request from the client device (e.g., a "pull" process).

Subsequent to receiving the content that is selected independent of the user of the client device, the client device displays (506) the content that is selected independent of the user of the client device (e.g., content 404-1 in FIG. 4A).

In some embodiments, operations 502 through 506 are repeated. For example, in some embodiments, the social network system continues to send content that is selected independent of the user of the client device, and the client device continues to receive and display the received content (e.g., sequentially display the received content in tile 404).

When the user of the client device requests a login (e.g., by providing login information, such as a user identifier and a login password, as illustrated in FIG. 4B), the client device receives (508) a user login request and sends (510) user login information (e.g., the user identifier and the login password) to the social network system 108 (e.g., login module 230 of the social network system 108 in FIG. 2) or a login server (also called herein a verification server or an authentication server) associated with the social network system 108.

The social network system receives (512) the login information. In some embodiments, the social network system authenticates the login information. Once the login information is authenticated, the social network system sends (514) to the client device content from users who are connected to the user of the client device (e.g., content from friends of the user in the social network).

The client device receives (516) content from users who are connected to the user of the client device and displays (518) the content. In some embodiments, the social network system also sends content selected for the user, which is received and displayed by the client device.

In some embodiments, operations 514 through 518 are repeated. For example, in some embodiments, the social network system continues to send content from users who are connected to the user of the client device, and the client device continues to receive and display the content.

When the user of the client device requests a logout (e.g., by selecting a logout user interface element as shown in FIG. 4J), the client device receives (520) a user logout request and sends (522) the user logout request to the social network system.

The social network system receives (524) the user logout request. Subsequent to receiving the user logout request, the social network system sends (526) content selected for the user of the client device (e.g., publicly available content that is selected based on the user's profile in the social network system), without sending the content from users who are connected to the first user.

The client device receives (528) and displays (530) the content selected for the user of the client device, without displaying the content from users who are connected to the first user.

In some embodiments, operations 526 through 530 are repeated. For example, in some embodiments, the social network system continues to send content selected for the user of the client device, and the client device continues to receive and display the content.

FIGS. 6A-6C are flow diagrams illustrating a method 600 of providing social network content on an electronic device, such as a client device 104, based on the login state of a user in accordance with some embodiments. The method provides social network content that is tailored to the user in both the logged-in and logged-out state, but the type(s) of tailored content that is provided depends on the login state of the user. This protects user privacy in the logged-out state, while still providing social network content that is tailored to the user in the logged-out state.

FIGS. 6A-6C correspond to instructions stored in a computer memory or computer readable storage medium (e.g., memory 306). The computer memory or computer readable storage medium stores one or more programs, including a first program (e.g., a social networking application program or a web browser configured to display a social networking website). The first program has a user-logged-in state for a first user who is associated with the device and a user-logged-out state that is distinct from the user-logged-in state for the first user.

The device communicates (602) with a social network system that is remote from the electronic device (e.g., the device requests content from the social network system to display in a first predetermined area in a first user interface, such as a tile or window in a home screen).

The device displays (604) a first user interface (e.g., a home screen) on the display, the first user interface including a first predetermined area on the display that corresponds to the first program (e.g., a tile, an icon, or other portion, less than all, of the first user interface for displaying content from the first program). For example, the user interface in FIG. 4A includes a first predetermined area (e.g., the 404). In some embodiments, the first predetermined area is visually distinct from a remaining area of the display (e.g., the first predetermined area and the remaining area have distinct colors). In some embodiments, the first user interface includes multiple predetermined areas that are separate and distinct from one another. In some embodiments, each of the multiple predetermined areas is used for displaying content (e.g., first content, second content, and/or third content) of a respective type or category (e.g., a first predetermined area is used for displaying music related content and a second predetermined area is used for displaying sports related content, etc.).

The device, in accordance with a determination that the first program is in the user-logged-in state for the first user, displays (606) in the first predetermined area first content from a plurality of users of the social network system that are connected to the first user (e.g., content from friends of the first user in a social networking service; in other words, content from other parties, such as individuals and/or businesses other than the first user, that the first user has "friended" in a social network, such as Facebook). For example, the device illustrated in FIG. 4C displays in the tile 404 content from a user ("Charlotte Lea") who is connected to the first user. In some embodiments, the content from a respective friend/connection includes one or more of photos, videos, text, status updates, posts, comments, recommendations, links (e.g., text and/or thumbnail image links), application activity, or likes from the respective friend/connection. In some embodiments, the first content includes content created by the first user (e.g., comments made by the first user or postings by the first user). In some embodiments, the first content does not include content created by the first user.

In some embodiments, the first content includes a first set of content items, a respective content item in the first set of content items having been selected by a respective user of the plurality of users to be shared only with one or more users of the social network system, including the first user, that are connected to the respective user. For example, in some embodiments, one or more content items are to be shared only with friends of an author of the one or more content items.

In some embodiments, the determination that the first program is in the user-logged-in state for the first user is made (608) by the electronic device. For example, the electronic device determines that the first program is in the user-logged-in state based on the user login request received by the electronic device.

In some embodiments, the determination that the first program is in the user-logged-in state for the first user is made (610) by the social network system that is remote from the electronic device. For example, the social network system determines that the first program is in the user-logged-in state for the first user based on the login information, for the first user, received by the social network system. In some embodiments, the social network system determines that the first program is in the user-logged-in state for the first user based on an authentication of the login information received from the electronic device.

In some embodiments, the first content from the plurality of users that are connected to the first user is sent (612) from the social network system to the electronic device (where it is received).

In some embodiments, the device, in accordance with the determination that the first program is in the user-logged-in state for the first user, displays (614) in the first predetermined area third content (e.g., content concerning trending topics, hashtags, stories, news articles and/or links thereto) that is selected for the first user (e.g., content 404-4 in FIG. 4F).

In some embodiments, the third content includes content trending with the plurality of users of the social network system that are connected to the first user (e.g., content viewed or voted favorably by many users of the social network system that are connected to the first user). In some embodiments, the third content includes trending content selected based on content trending with the plurality of users of the social network system that are connected to the first user. For example, in accordance with a determination that the plurality of users of the social network system that are connected to the first user have read various music stories recently, trending music stories are included in the third content.

In some embodiments, the third content is selected based on information detected by the device (e.g., ambient information). For example, while the device plays particular music, an article about the particular music is selected as part of the third content. In another example, while the device detects a loud noise, a review article or an advertisement for a noise-canceling headphone is selected as part of the third content.

In some embodiments, the first content in the first predetermined area is replaced with the third content (e.g., content in the predetermined area 404, FIGS. 4D-4F). Alternatively, the first content and the third content are displayed simultaneously in the first predetermined area.

In some embodiments, the device displays a user interface of a second program (e.g., a web browser) that is distinct from the first program, and each of the first content and the third content is displayed in a popup view (e.g., a notification popup view) over the user interface of the second program. In some embodiments, the popup view ceases to be displayed after a predetermined time interval.

In some embodiments, the device, in accordance with the determination that the first program is in the user-logged-in state for the first user, displays in the first predetermined area first content and third content. In some embodiments, the device ranks all of the content that is eligible to be shown to the first user and then selects the top N content items for display in the first predetermined area, where N is an integer.

In some embodiments, the third content is selected for a cluster of users that includes the first user, such as other users in the social network system that have common interests with the first user and/or common demographics with the first user.

In some embodiments, the second content is (618, FIG. 6B) the same as the third content. For example, "Festival Locations in the Bay Area" selected for the first user (FIG. 4F) while the first program is in the user-logged-in state is the same as "Festival Locations in the Bay Area" selected for the first user (FIG. 4K) while the first program is in the user-logged-out state.

In some embodiments, the second content is (620) distinct from the third content. In other words, in some embodiments, the content selected for the first user while the first program is in the user-logged-in state need not be the same as the content selected for the first user while the first program is in the user-logged-out state. For example, in some embodiments, the content selected for the first user while the first program is in the user-logged-in state is selected based on the topics of interest and the geographic location of the first user and the content selected for the first user while the first program is in the user-logged-out state is selected based on the geographic location of the first user only.

In some embodiments, while the first program is in the user-logged-in state for the first user, the first content from the plurality of users is displayed (622) in the first predetermined area interspersed with the third content. In some embodiments, the first content from the plurality of users is temporally interspersed with the third content (e.g., the first content and the third content are sequentially displayed). In some embodiments, the first content from the plurality of users is spatially interspersed with the third content (e.g., the first content and the third content are concurrently displayed in different portions of the first predetermined area).

In some embodiments, while the first program is in the user-logged-in state for the first user, the first content from the plurality of users is displayed (624) in the first predetermined area interspersed with the third content and interspersed with advertisements or links to advertisements selected for the first user. In some embodiments, the first content from the plurality of users is temporally interspersed with the third content and advertisements selected for the first user (e.g., the first content, the third content, and the advertisements are sequentially displayed). In some embodiments, the first content from the plurality of users is spatially interspersed with the third content and advertisements selected for the first user (e.g., the first content, the third content, and the advertisements are concurrently displayed in different portions of the first predetermined area). In some embodiments, advertisements (or links thereto) are selected to be displayed to the first user based at least in part on a profile of the first user in the social network system and/or prior interactions of the first user with the social network system. For example, if the first user has previously "liked" articles about a first subject (e.g., pro football) while in the social network, selected links (text and/or thumbnail image links) to articles, videos, or images about the first subject, commented favorably on articles, videos, or images about the first subject, "friended" (in the social networking sense), people or businesses connected with the first subject, and/or posted messages concerning the first subject, then advertisements (or links thereto) related to the first subject (e.g., premium television programming for pro football, football fan gear, and/or other football-related merchandise, such as beer) may be selected for the first user by the social network system and displayed in the first predetermined area because the prior "positive" interactions by the first user with content in the social network indicate that the first user may be interested in viewing advertisements related to the first subject. In some embodiments, analogous "positive" interactions by friends of the first user may be used (in addition to or in place of the positive interactions by the first user) to select advertisements (or links thereto) for the first user.

Conversely, if the first user (and/or friends of the first user) does not perform any of these positive interactions on a second subject (e.g., politics), and/or "dislikes" (in the social networking sense), hides, deletes, or removes articles about the second subject, then advertisements (or links thereto) related to the second subject may not be selected for the first user by the social network system and may not be displayed in the first predetermined area, because the prior "negative" interactions by the first user with content in the social network indicate that the first user is not interested in viewing advertisements about the second subject. In some embodiments, analogous "negative" interactions by friends of the first user may be used (in addition to or in place of the negative interactions by the first user) to prevent selection of some advertisements (or links thereto) for the first user.

In some embodiments, the advertisements are selected for a cluster of users that includes the first user, such as other users in the social network system that have common interests with the first user and/or common demographics with the first user.

In some embodiments, when the first program is in the user-logged-in state for the first user, the first content from the plurality of users and the third content are displayed (626) in a scrolling list in the first predetermined area (e.g., a vertically scrolling list or a horizontally scrolling list is displayed in the first predetermined area, with the list containing content from friends of the first user in the social network, as well as content concerning trending topics, hashtags, stories, news articles, and/or links thereto that are automatically selected for the first user by the social network system). For example, FIGS. 4D-4F illustrate a scrolling list of content in the tile 404. Alternatively, a different transition effect is used (e.g., fading out and fading in, changing opacity, transitioning from a fuzzy display to a clear display).

In some embodiments, the first program communicates with the social network system, and the third content is selected (628) for the first user by the social network system based in part on a profile of the first user in the social network system. For example, local news is selected based on a geographic location of the first user in the profile of the first user.

In some embodiments, the first program communicates with the social network system, and the third content is selected (630) for the first user by the social network system based in part on interactions of the first user with the social network system. For example, if the first user liked social network content related to a particular subject (e.g., a watch), social network content related to the particular subject matter (e.g., news articles about a watch manufacturer, events by a watch manufacturer, etc.) is selected.

In some embodiments, the first program communicates with the social network system, and the third content is selected (632) for the first user by the social network system based in part on prior interactions of users that are connected to the first user in the social network system. For example, if friends of the first user in the social network system like a local event, news articles about the local event are selected for the first user independent of a user input from the first user. In another example, if friends of the first user in the social network system like a particular topic (e.g., local events), content about the particular topic (e.g., local news articles in general) is selected for the first user independent of a user input from the first user.

In some embodiments, the device, while the first program is in the user-logged-in state for the first user, detects (616, FIG. 6A) an input on the first predetermined area. In some embodiments, the input is a gesture (e.g., a tap gesture) on a touch-sensitive surface at a location that corresponds to the predetermined area (e.g., touch input 409 in FIG. 4H). In some embodiments, the input is a mouse click while a cursor is displayed over the predetermined area. The device, in response to detecting the input on the first predetermined area, replaces the display of the first user interface on the display with the display of a second user interface, the second user interface including a second predetermined area on the display that corresponds to the first program. In some embodiments, the second predetermined area is larger than the first predetermined area (e.g., the second predetermined area 420 in FIG. 4I). For example, display of a home screen that contains a tile displaying content from friends of the first user in a social networking service and links to recent news articles selected for the first user is no longer displayed. Rather, the home screen is replaced by a second user interface that includes a predetermined area for the social networking application that is larger than the tile on the home screen. In some embodiments, the second predetermined area covers at least half of the display. In some embodiments, the second predetermined area covers substantially all of the display (e.g., at least 80%, 90%, or 95% of the display). In some embodiments, the first predetermined area includes video content or music content, and the second predetermined area includes the same video content or the same music content.

In some embodiments, the device, while the first program is in the user-logged-in state for the first user, detects an input on the first predetermined area (e.g., touch input 409 in FIG. 4H) and updates the first predetermined area in accordance with the detected input on the first predetermined area. For example, the first predetermined area includes a scrollable map, and the device scrolls the map in accordance with a detected input (e.g., a pan gesture) on the scrollable map.

The device, in accordance with a determination that the first program is in the user-logged-out state, displays (634, FIG. 6C) in the first predetermined area second content (e.g., content concerning trending topics, hashtags, stories, news articles, and/or links thereto) that is selected for the first user, without displaying (or otherwise presenting) the first content from the plurality of users of the social network system that are connected to the first user. For example, in FIGS. 4K-4L, second content that is selected for the first user is displayed in the tile 404 without displaying the first content from the plurality of users of the social network system that are connected to the first user. In some embodiments, the second content excludes content created by the first user (e.g., comments made by the first user or postings by the first user). In some embodiments, the second content includes trending content items in the social network system (e.g., content items about popular topics or content items containing popular keywords or hashtags) that are selected for the first user based at least in part on a profile of the first user in the social network system and/or prior interactions of the first user with the social network system.

In some embodiments, links (e.g., text and/or thumbnail image links) to news articles (e.g., headlines, sports, business, technology, entertainment, lifestyle, politics, world news, national news, and/or other similar articles) or other content are selected to be displayed to the first user based at least in part on a profile of the first user in the social network system and/or prior interactions of the first user with the social network system. For example, if the first user has previously "liked" articles about a first subject (e.g., pro football) while in the social network, selected links (text and/or thumbnail image links) to articles, videos, or images about the first subject, commented favorably on articles, videos, or images about the first subject, "friended" (in the social networking sense), people or businesses connected with the first subject, and/or posted messages concerning the first subject, then links to recent content concerning the first subject (e.g., pro football) may be selected for the first user by the social network system and displayed in the first predetermined area because the prior "positive" interactions by the first user with content in the social network indicate that the first user is interested in viewing content about the first subject. In some embodiments, analogous "positive" interactions by friends of the first user may be used (in addition to or in place of the positive interactions by the first user) to select some links to content for the first user.

Conversely, if the first user (and/or friends of the first user) does not perform any of these positive interactions on a second subject (e.g., politics), and/or "dislikes" (in the social networking sense), hides, deletes, or removes articles and other content about the second subject, then links to recent content concerning the second subject may not be selected for the first user by the social network system and may not be displayed in the first predetermined area, even if some of the recent top content on the social network as a whole concern the second subject (e.g., politics), because the prior "negative" interactions by the first user with content in the social network indicate that the first user is not interested in viewing content about the second subject. In some embodiments, analogous "negative" interactions by friends of the first user may be used (in addition to or in place of the negative interactions by the first user) to prevent selection of some links to content for the first user.

In some embodiments, the second content is selected for a cluster of users that includes the first user, such as other users in the social network system that have common interests with the first user and/or common demographics with the first user.

In some embodiments, the second content is from a second plurality of users, the second content including a second set of content items, a respective content item of the second set of content items having been authored by a respective user of the second plurality of users and selected by the respective user to be shared with any user of the social network system.

In some embodiments, the second content is selected (636) for the first user by the social network system.

In some embodiments, the second content that is selected (638) for the first user is sent from the social network system to the electronic device (where it is received).

In some embodiments, when (or while) the first program is in the user-logged-out state, the second content selected for the first user is displayed (640) in the first predetermined area interspersed with advertisements or links to advertisements selected for the first user.

In some embodiments, the second content is selected (642) for the first user while the first program is in the user-logged-out state based in part on information (e.g., an identifier), used for identifying the first user, that is contained in the electronic device. For example, the social network system selects news articles or links thereto or other content for the first user (which are selected based in part on the express or implied interests of the first user, as explained above) and sends this content to the electronic device for display, even though the first user is not logged in to the first program, by using an identifier of the first user that is contained in a cookie on the electronic device to associate/connect the electronic device with the first user. In some embodiments, the information used for identifying the first user is contained in a data file stored in the electronic device. In some embodiments, the information used for identifying the first user is contained in a cookie in the electronic device. In some embodiments, the cookie contained in the electronic device is encrypted. In some embodiments, the cookie contained in the electronic device includes additional information that is distinct from the information used for identifying the first user. For example, the cookie optionally includes information identifying a frequency of user interaction with a particular category or type of content items (e.g., a number of music stories that the first user has read). In some embodiments, the identifier is a user name for the first user in the first program. In some embodiments, the identifier is an encrypted user name for the first user in the first program. In some embodiments, the identifier is a phone number for the first user. In some embodiments, the identifier is an encrypted phone number for the first user. In some embodiments, the identifier is a device identifier, such as a MAC address for the device or an encrypted MAC address for the device. In some embodiments, the second content is selected for the first user while the first program is in the user-logged-out state based in part on information (e.g., an identifier), used for identifying the first user, that is stored in the electronic device.

In some embodiments, the second content is selected (644) for the first user based in part on user interactions with the electronic device that are detected by the electronic device while the first program is in the user-logged-out state. In some embodiments, the electronic device detects activation of links to content in the first predetermined area, while the first program is in the user-logged out state, and the social network system subsequently sends links to similar or related content while the first program is in the user-logged out state. In some embodiments, the electronic device detects frequent launching or use of a particular application stored in the electronic device, and the social network system subsequently sends content similar or related to a function of the particular application (e.g., the social network server sends weather updates or links thereto if the user uses a weather application, sends restaurant reviews or links thereto if the user uses a restaurant review application or visits a restaurant review website, etc.). In some embodiments, the second content is selected for the first user also based on additional information, such as a time of day associated with the user interactions with the electronic device and a time of day associated with selecting the second content. For example, when the first user frequently reads music stories in the evenings, recent music stories are selected as part of the second content in the evening time.

In some embodiments, the device, in accordance with a determination that the first program is in an initial-login state, the initial-login state being distinct from the user-logged-in state and the user-logged-out state, displays (646) in the first predetermined area fourth content that is selected independent of a profile of the first user in the social network system. In some embodiments, the initial-login state is a state on a given electronic device in which no user has yet logged into the social network system. In some embodiments, while in the initial-login state, the electronic device displays in the first predetermined area trending and/or recent content items in the social network system (e.g., content items about popular topics or content items containing popular keywords or hashtags) that are selected independent of the identity of the first user and prior interactions of the first user with the social network system. In other words, in the initial-login state, the electronic device is not associated/connected with any particular user by the social network system, so the (fourth) content is not selected by the social network system for a particular user.

In some embodiments, while the first program is in the user-logged-out state and second content is being displayed in the first predetermined area (or the first program is in the initial-login state and fourth content is being displayed in the first predetermined area), the device detects an input on the first predetermined area (e.g., a tap gesture), and displays a user interface of the first program in response. In some embodiments, the user interface of the first program displayed in response includes content previously displayed in the first predetermined area when the input was detected on the first predetermined area. In some embodiments, the user interface of the first program displayed in response includes a login user interface element (e.g., login user interface element 408 in FIG. 4A). Thus, for a user who is logged out (or has never logged in before) and is viewing public content in the first predetermined area, tapping or clicking on the content in the first predetermined area opens the first program and displays the content within the first program, and also provides an option for the user to log in to the first program.

In some embodiments, the first user interface is a lock screen. In some embodiments, the first user interface is a screen saver. In some embodiments, while displaying a lock screen or a screen saver, in accordance with a determination that the first program is in the user-logged-in state for the first user, the device displays the second content without displaying the first content. This protects the first user's privacy, as content from users of the social network system that are connected to the first user are not displayed on the lock screen or the screen saver. Alternatively, in some embodiments, while displaying a lock screen or a screen saver, in accordance with a determination that the first program is in the user-logged-in state for the first user, the device displays the first content. This helps the first user to access content from a plurality of users of the social network system that are connected to the first user. In some embodiments, the device stores information, identifying a selection made by the first user, indicating whether (A) the first content is to be displayed or (B) the second content is to be displayed without displaying the first content, while displaying a lock screen or a screen saver. While displaying a lock screen or a screen saver, in accordance with a determination that the first program is in the user-logged-in state for the first user, the device displays (A) the first content or (B) the second content without displaying the first content, based on information identifying the user selection.

In some embodiments, the device receives a first user input requesting termination of updating content in the first predetermined area (e.g., a first predefined gesture or a selection of a first user interface element, which, when selected, initiates termination of updating content in the first predetermined area), and, in response to receiving the first user input, ceases to update content in the first predetermined area. In some embodiments, in response to receiving the first user input, the device ceases to display content in the first predetermined area. In some embodiments, the device receives a second user input (e.g., a second predefined gesture or a selection of a second user interface element, which, when selected, initiates updating content in the first predetermined area), and, in response to receiving the second user input, initiates (or resumes) updating content in the first predetermined area.

Some of the features discussed above with respect to operations at the client device are applicable to the social network system in an analogous manner. For brevity, these details are not repeated below.

FIGS. 7A-7B are flow diagrams illustrating a method 700 of providing social network content by a social network system (e.g., system 108) based on the login state of a user in accordance with some embodiments. FIGS. 7A-7B correspond to instructions stored in a computer memory or computer readable storage medium (e.g., memory 206). The method provides social network content that is tailored to the user in both the logged-in and logged-out state, but the type(s) of tailored content that is provided depends on the login state of the user. This protects user privacy in the logged-out state, while still providing social network content that is tailored to the user in the logged-out state.

The social network system 108 communicates (702) with an electronic device 104 associated with a first user (e.g., a client device such as a smart watch, a smart phone, a tablet, a laptop, or a desktop computer) that is remote from the social network system (e.g., receiving a request for content from the electronic device).

The social network system 108, in accordance with a determination that the first user is logged in to the social network system, sends (704) to the electronic device first content from a plurality of users of the social network system that are connected to the first user for display in a first predetermined area in a first user interface (e.g., content from friends of the first user in the social network system; in other words, content from other parties (e.g., individuals or businesses other than the first user) that the first user has "friended" or otherwise connected with in a social network, such as Facebook). In some embodiments, the content from a respective friend includes one or more of photos, videos, status updates, posts, comments, recommendations, links (e.g., text and/or thumbnail image links), or likes from the respective friend). In some embodiments, the first predetermined area corresponds to a first program included in the electronic device, such as a social networking application program. In some embodiments, the social network system sends the first content to the electronic device while the first user is logged out of the social network system (pre-loading the electronic device with the first content), but the first content is not displayed on the electronic device until the first user is logged in to the social network system.

In some embodiments, the social network system, in accordance with the determination that the first user is logged in to the social network system, sends (706) to the electronic device third content that is selected for the first user (e.g., content concerning trending topics, hashtags, stories, news articles and/or links thereto as shown in content 404-4 of FIG. 4F). In some embodiments, the social network system sends the third content to the electronic device while the first user is logged out of the social network system (pre-loading the electronic device with the third content), but the third content is not displayed on the electronic device until the first user is logged in to the social network system.

In some embodiments, the second content is (708) the same as the third content. For example, "Festival Locations in the Bay Area" selected for the first user (FIG. 4F) while the first program is in the user-logged-in state is the same as "Festival Locations in the Bay Area" selected for the first user (FIG. 4K) while the first program is in the user-logged-out state.

In some embodiments, the second content is (710) distinct from the third content. For example, in some embodiments, the content selected for the first user while the first program is in the user-logged-in state is selected based on the topics of interest and the geographic location of the first user and the content selected for the first user while the first program is in the user-logged-out state is selected based on the geographic location of the first user only.

In some embodiments, the social network system, in accordance with the determination that the first user is logged in to the social network system, sends (712) to the electronic device advertisements selected for the first user. In some embodiments, the advertisements are selected based on the user profile of the first user. In some embodiments, the social network system sends the advertisements to the electronic device while the first user is logged out of the social network system (pre-loading the electronic device with the advertisements), but the advertisements are not displayed on the electronic device until the first user is logged in to the social network system.

In some embodiments, the third content is selected (714) for the first user by the social network system based in part on a profile of the first user in the social network system. For example, local news is selected based on a geographic location of the first user in the profile of the first user.

In some embodiments, the third content is selected (716) for the first user by the social network system based in part on interactions of the first user with the social network system. For example, if the first user liked social network content related to a particular subject (e.g., a watch), social network content related to the particular subject matter (e.g., news articles about a watch manufacturer, events by a watch manufacturer, etc.) is selected.

In some embodiments, the third content is selected (718) for the first user by the social network system based in part on prior interactions of users that are connected to the first user in the social network system. For example, if friends of the first user in the social network system like a local event, news articles about the local event are selected for the first user independent of a user input from the first user.

The social network system, in accordance with a determination that the first user is logged out of the social network system, sends (720, FIG. 7B) to the electronic device second content (e.g., content concerning trending topics, hashtags, stories, news articles, and/or links thereto) that is selected for the first user for display in the first predetermined area in the first user interface, without sending the first content from the plurality of users of the social network system that are connected to the first user (e.g., links to news articles or other content that are selected to be displayed to the first user based at least in part on a profile of the first user in the first program, prior interactions by the first user with the first program, and/or prior interactions by friends of the first user with the first program, as explained above). For example, in FIGS. 4K-4L, the second content that is selected for the first user is received by the electronic device without receiving the first content from the plurality of users of the social network system that are connected to the first user, and as a result, the second content that is selected for the first user is displayed in the tile 404 without displaying (or otherwise presenting) the first content from the plurality of users of the social network system that are connected to the first user. In some embodiments, the social network system sends the second content to the electronic device while the first user is logged in to the social network system (pre-loading the electronic device with the second content), but the second content is not displayed on the electronic device until the first user is logged out of the social network system.

In some embodiments, the social network system, in accordance with the determination that the first user is logged out of the social network system, sends (722) to the electronic device advertisements selected for the first user. In some embodiments, the advertisements are selected based on the user profile of the first user.

In some embodiments, the second content is selected (724) for the first user, while the first user is logged out of the social network system, based in part on information, used for identifying the first user, that is contained in the electronic device. In some embodiments, the information used for identifying the first user is contained in a data file stored in the electronic device. In some embodiments, the information used for identifying the first user is contained in a cookie in the electronic device.

In some embodiments, the second content is selected (726) for the first user based in part on user interactions with the electronic device that are detected by the electronic device while the first user is logged out of the social network system. In some embodiments, the electronic device detects activation of links to content in the first predetermined area, while the first program is in the user-logged out state, and the social network system subsequently sends links to similar or related content while the first program is in the user-logged out state. In some embodiments, the electronic device detects frequent launching or use of a particular application stored in the electronic device, and the social network system subsequently sends links to content similar or related to a function of the particular application (e.g., weather updates if the user frequently uses a weather application, sends restaurant reviews if the user frequently uses a restaurant review application or frequently visits a restaurant review website, etc.).

In some embodiments, the social network system, in accordance with a determination that no user has logged into the social network system from the electronic device, sends (728) to the electronic device fourth content that is selected independent of a profile of the first user in the social network system. In some embodiments, in accordance with the determination that no user has logged into the social network system from the electronic device, the social network system sends to the electronic device trending content items in the social network system (e.g., content items about popular topics or content items containing popular keywords or hashtags) that are selected independent of the identity of the first user and prior interactions of the first user with the social network system.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art so drawings herein do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A non-transitory computer readable storage medium storing one or more programs, the one or more programs comprising instructions, which, when executed by a social network system with one or more processors, cause the social network system to:
communicate with an electronic device associated with a first user that is remote from the social network system;
in accordance with a determination that the first user is logged in to the social network system, send to the electronic device first content from a plurality of users of the social network system that are connected to the first user for display in a first predetermined area in a first user interface; and,
in accordance with a determination that the first user is logged out of the social network system, send to the electronic device second content that is selected for the first user for display in the first predetermined area in the first user interface, without sending the first content from the plurality of users of the social network system that are connected to the first user, wherein the second content is selected for the first user based in part on user interactions with the electronic device that are detected by the electronic device while the first user is logged out of the social network system.

2. The computer readable storage medium of claim 1, including instructions, which, when executed by the social network system with one or more processors, cause the social network system to, in accordance with the determination that the first user is logged in to the social network system, send to the electronic device third content that is selected for the first user for display in the first predetermined area in the first user interface.

3. The computer readable storage medium of claim 2, wherein the second content is the same as the third content.

4. The computer readable storage medium of claim 2, wherein the second content is distinct from the third content.

5. The computer readable storage medium of claim 2, including instructions, which, when executed by the social network system with one or more processors, cause the social network system to, in accordance with the determination that the first user is logged in to the social network system, send to the electronic device advertisements selected for the first user.

6. The computer readable storage medium of claim 2, wherein the third content is selected for the first user by the social network system based in part on a profile of the first user in the social network system.

7. The computer readable storage medium of claim 2, wherein the third content is selected for the first user by the social network system based in part on interactions of the first user with the social network system.

8. The computer readable storage medium of claim 2, wherein the third content is selected for the first user by the social network system based in part on prior interactions of users that are connected to the first user in the social network system.

9. The computer readable storage medium of claim 1, wherein the second content includes advertisements or links to advertisements selected for the first user.

10. The computer readable storage medium of claim 1, wherein the second content is selected for the first user, while the first user is logged out of the social network system, based in part on information, used for identifying the first user, that is contained in the electronic device.

11. The computer readable storage medium of claim 1, including instructions, which, when executed by the social network system with one or more processors, cause the social network system to, in accordance with a determination that no user has logged into the social network system from the electronic device, send to the electronic device fourth content that is selected independent of a profile of the first user in the social network system.

12. A social network system, comprising:
one or more processors; and
memory; the memory storing one or more programs that are configured to be executed by the one or more processors, the one or more programs including instructions for:
communicating with an electronic device associated with a first user that is remote from the social network system;
in accordance with a determination that the first user is logged in to the social network system, sending to the electronic device first content from a plurality of users of the social network system that are connected to the first user for display in a first predetermined area in a first user interface; and,
in accordance with a determination that the first user is logged out of the social network system, sending to the electronic device second content that is selected for the first user for display in the first predetermined area in the first user interface, without sending the first content from the plurality of users of the social network system that are connected to the first user, wherein the second content is selected for the first user based in part on user interactions with the electronic device that are detected by the electronic device while the first user is logged out of the social network system.

13. A method, comprising:
at a social network system having one or more processors and memory, the memory storing one or more programs for execution by the one or more processors:
communicating with an electronic device associated with a first user that is remote from the social network system;
in accordance with a determination that the first user is logged in to the social network system, sending to the electronic device first content from a plurality of users of the social network system that are connected to the first user for display in a first predetermined area in a first user interface; and, in accordance with a determination that the first user is logged out of the social network system, sending to the electronic device second content that is selected for the first user for display in the first predetermined area in the first user interface, without sending the first content from the plurality of users of the social network system that are connected to the first user, wherein the second content is selected for the first user based in part on user interactions with the electronic device that are detected by the electronic device while the first user is logged out of the social network system.

14. A non-transitory computer readable storage medium storing one or more programs, the one or more programs comprising instructions, which, when executed by a social network system with one or more processors, cause the social network system to:

communicate with an electronic device associated with a first user that is remote from the social network system;

in accordance with a determination that the first user is logged in to the social network system, send to the electronic device first content from a plurality of users of the social network system that are connected to the first user for display in a first predetermined area in a first user interface;

in accordance with a determination that the first user is logged out of the social network system, send to the electronic device second content that is selected for the first user for display in the first predetermined area in the first user interface, without sending the first content from the plurality of users of the social network system that are connected to the first user; and in accordance with a determination that no user has logged into the social network system from the electronic device, send to the electronic device third content that is selected independent of a profile of the first user in the social network system.

* * * * *